(12) United States Patent
Laron et al.

(10) Patent No.: US 12,536,011 B2
(45) Date of Patent: Jan. 27, 2026

(54) SYSTEMS AND METHODS FOR GENERATING AND APPLYING A PATCH PACKAGE

(71) Applicant: FILO SYSTEMS LTD., Tivon (IL)

(72) Inventors: Etamar H. Laron, Tivon (IL); Michael J. May, Tivon (IL)

(73) Assignee: FILO SYSTEMS LTD., Tivon (IL)

( * ) Notice: Subject to any disclaimer, the term of this patent is extended or adjusted under 35 U.S.C. 154(b) by 241 days.

(21) Appl. No.: 18/573,438

(22) PCT Filed: Jun. 22, 2022

(86) PCT No.: PCT/IL2022/050670
§ 371 (c)(1),
(2) Date: Dec. 22, 2023

(87) PCT Pub. No.: WO2022/269612
PCT Pub. Date: Dec. 29, 2022

(65) Prior Publication Data
US 2024/0289121 A1 Aug. 29, 2024

(30) Foreign Application Priority Data
Jun. 22, 2021 (IL) .......................................... 284315

(51) Int. Cl.
G06F 8/60 (2018.01)
G06F 8/658 (2018.01)
(52) U.S. Cl.
CPC .................................... G06F 8/658 (2018.02)
(58) Field of Classification Search
CPC ............................ G06F 8/658; H03M 7/3091
See application file for complete search history.

(56) References Cited

U.S. PATENT DOCUMENTS

| | | | |
|---|---|---|---|
| 7,185,332 B1 | 2/2007 | Waldin et al. | |
| 7,251,812 B1 | 7/2007 | Jhanwar et al. | |
| 11,442,848 B1* | 9/2022 | Crenshaw ........... | G06F 11/3495 |
| 2005/0257208 A1 | 11/2005 | Blumfield et al. | |
| 2013/0132936 A1* | 5/2013 | Wang ........................ | G06F 8/65 |
| | | | 717/170 |
| 2014/0101646 A1* | 4/2014 | Buzaski .................... | G06F 8/71 |
| | | | 717/168 |
| 2018/0173723 A1 | 6/2018 | Pfeifle et al. | |

OTHER PUBLICATIONS

Samteladze Nikolai: "Delta Encoding Based 1,8,9, INV. Methods to Reduce the Size of Smartphone 11,12 Application Updates", USF Tampa Graduate Theses and ADD. Dissertations, Jan. 1, 2013 (Jan. 1, 2013), pp. 1-72.

* cited by examiner

*Primary Examiner* — Hanh Thi-Minh Bui
(74) *Attorney, Agent, or Firm* — NKL Law; Jae Youn Kim

(57) ABSTRACT

Systems and methods of creating and applying a software package (commonly referred to as "patch" or "patch package") that enables to more efficiently create an updated version of a software package, by applying the patch over the original software version. Embodiments of the present invention may require more resources, e.g., time, processing power and storage space, to prepare (create) a patch (compared to differencing modules of the art) as they spend more time analyzing the logical structure of each version, but the result is oftentimes a smaller and more efficient patch package. Also are disclosed systems and methods of compressing and decompressing a patch package, whether as an update or by using a single-archive input.

20 Claims, 6 Drawing Sheets

SYSTEMS AND METHODS FOR GENERATING AND APPLYING A PATCH PACKAGE

TECHNICAL FIELD

The present invention relates in general to software systems and methods of incremental updates, and in particular to software systems and methods for generating an efficient patch package taking into account the content and structure of the origin software.

BACKGROUND ART

Several fields of computing rely on ever larger collections of files, collections that need to be updated from time to time. Updates are versatile in use, so they may include adding new features, removing features, correcting bugs, fixing security issues etc. In other cases, Updates are used to track changes over time. This is evident in document management systems, version control, backup and restore systems as well as log-based database updates.

In the earlier days of computing, new versions were released less frequently, were smaller in size and were delivered on hard media such as a CD-ROM. Today, online updates are larger in size, more frequently released, and at times downloaded by a large number of users, shortly after their release, for example, in cases when releasing critical security updates for a newly discovered security breach, or when a new version of a popular game or application becomes available.

These updates are grouped into a single element referred to as "patch" that is applied to an existing software version in order to upgrade it to the newer version. Typically, a user downloads a patch and upgrades to the newer version by applying the patch over the existing software version. Sending a patch is deemed more efficient, in terms of the size of the file downloaded by the user, than sending the entire brand-new version.

When such updates are to be sent to hundreds of thousands of computing devices, or in some cases even hundreds of millions of computing devices over a short period of time, it may become a high priority to reduce data communication costs and bandwidth requirements. Also, reducing the time required to download and update these computing devices improves the user experience.

SUMMARY OF INVENTION

The present invention relates to a patch generating computing system comprising: at least one processor; and at least one memory communicatively coupled to the at least one processor comprising computer-readable instructions that when executed by the at least one processor cause the computing system to implement a method of generating a patch package comprising patch data and patch instructions, the patch package adapted to update an original archive element to a destination archive element, the method comprising:
 (i) assigning original archive element as an original element in a matching pair, and assign destination archive element as a destination element in the matching pair;
 (ii) comparing the original element and the destination element in the matching pair, and if different, preparing a corresponding patch instruction comprising an action indicating a patch operation of either addition, deletion or updating related to the destination element;
 (iii) identifying a structural type of the original element and the destination element, the structural type being one of "directory", "archive", "compressed" or "data";
 (iv) if the structural type is a complex archive element:
  a. identifying at least one decompressing module or unpacking module adapted to be applied to the original element and the destination element;
  b. applying the identified at least one decompressing module or unpacking module to the original element, and saving the resulting zero or more internal archive elements to an original archive structure comprising a plurality of archive elements;
  c. applying the identified at least one decompression module or unpacking module to the destination element, and saving the resulting zero or more internal archive elements to a destination archive structure comprising a plurality of archive elements;
 (v) updating a patch instruction in respect of the destination element, the patch instruction comprising the patch instruction action, a structural type, an identifier of the destination element, and the identified at least one decompressing or unpacking module;
 (vi) identifying further one or more matching pairs, each further one or more matching pair comprising of one internal archive element from the resulting zero or more internal archive elements of step (iv.b) assigned as internal element, and one internal archive element from the resulting zero or more internal archive elements of step (iv.c) assigned as destination element, wherein original element and destination element are matched by identifying an identical identifier;
 (vii) repeating steps (ii) to (vi) for the further one or more matching pairs;
 (viii) applying a differencing module to the original archive structure and the destination archive structure and generating a patch package comprising patch data and patch instructions such that the destination archive element can be constructed by applying the patch data together with the patch instructions to the corresponding original archive element.

In some embodiments, when the identified structural type of an archive element is "data", the method further comprises:
 a. identifying the datatype of the destination element and identifying a decoding module capable of transforming the identified datatype into a decoded data format;
 b. applying the identified decoding module to the destination element and generating a decoded version of the destination element to replace the destination element in the destination archive structure;
 c. applying the identified decoding module to the original element and generating a decoded version of the original element to replace the original element in the original archive structure; and
 d. indicating the datatype or the decoding module or both in the patch-instruction In some embodiments, prior to step (viii) the archive elements are ordered one or more times according to ordering criteria into a grouped sequence of archive elements, and in step (vi) the archive elements are input to the differencing module one or more times in the grouped sequence, resulting in one or more patch packages.

In some embodiments, ordering criteria comprise: a natural order; a sorted order; matching pairs of archive elements are grouped according to their identified datatypes; matching pairs are grouped according to a property of their archive elements; matching pairs according to a property of archive elements within the patch instruction; or any combination thereof.

In some embodiments, in step (viii) multiple differencing modules are applied, resulting in multiple patch packages.

In some embodiments, in step (viii) the differencing module is run multiple times using different differencing module parameters comprising dictionary size and/or compression level, resulting in multiple patch packages in respect of every differencing module run.

In some embodiments, the computing system further comprises the step of identifying a most efficient patch from the resulted patch packages, according to predetermined selection criteria.

In some embodiments, the original archive element is null, resulting in patch package that is a compressed form of the destination archive element.

In some embodiments, the computing system further comprises patch generator policies that specify rules and preferences for how to generate the patch package.

In some embodiments, the patch generator policies comprise logical predicates regarding transformational modules, structural types, content identifying modules, differencing modules, data types and properties of archive elements.

In some embodiments, in step (iii) a structural type of "link" can be identified.

In some embodiments, the computing system further includes in the patch-instruction an indication of another archive element containing the same data as the destination element, or an indication of another patch instruction resulting in the destination element.

In another aspect, the present invention relates to a patch generating method, implemented in a computing system comprising: at least one processor; and at least one memory communicatively coupled to the at least one processor comprising computer-readable instructions that when executed by the at least one processor cause the computing system to implement a method of generating a patch package comprising patch data and patch instructions, the patch package adapted to update an original archive element to a destination archive element, the method comprising:
  (i) assigning original archive element as an original element in a matching pair, and assign destination archive element as a destination element in the matching pair;
  (ii) comparing the original element and the destination element in the matching pair, and if different, preparing a corresponding patch instruction comprising an action indicating a patch operation of either addition, deletion or updating related to the destination element;
  (iii) identifying a structural type of the original element and the destination element, the structural type being one of "directory", "archive", "compressed" or "data";
  (iv) if the structural type is a complex archive element:
  a. identifying at least one decompressing module or unpacking module adapted to be applied to the original element and the destination element;
  b. applying the identified at least one decompressing module or unpacking module to the original element, and saving the resulting zero or more internal archive elements to an original archive structure comprising a plurality of archive elements;
  c. applying the identified at least one decompression module or unpacking module to the destination element, and saving the resulting zero or more internal archive elements to a destination archive structure comprising a plurality of archive elements;
  (v) updating a patch instruction in respect of the destination element, the patch instruction comprising the patch instruction action, a structural type, an identifier of the destination element, and the identified at least one decompressing or unpacking module;
  (vi) identifying further one or more matching pairs, each further one or more matching pair comprising of one internal archive element from the resulting zero or more internal archive elements of step (iv.b) assigned as internal element, and one internal archive element from the resulting zero or more internal archive elements of step (iv.c) assigned as destination element, wherein original element and destination element are matched by identifying an identical identifier;
  (vii) repeating steps (ii) to (vi) for the further one or more matching pairs;
  (viii) applying a differencing module to the original archive structure and the destination archive structure and generating a patch package comprising patch data and patch instructions such that the destination archive element can be constructed by applying the patch data together with the patch instructions to the corresponding original archive element.

In a further aspect, the present invention relates to a patch application computing system comprising: at least one processor; and at least one memory communicatively coupled to the at least one processor comprising computer-readable instructions that when executed by the at least one processor cause the computing system to implement a method of generating a destination archive element based on an original archive element and a patch package comprising a plurality of patch instructions and patch data, the method comprising:
  for each patch instruction of the patch instructions, perform on the element indicated by the patch instruction:
  (i) identifying the structural type of the element, the structural type comprising "directory", "archive", "compressed", "link" or "data", and an action in respect of the element;
  (ii) identifying the element within the original archive element as original element, and if necessary, applying steps (iii) and (iv) to its location in order to obtain the element in cases it is within an archive or within a compressed location;
  (iii) if the structural type is compressed:
  a. identifying a decompression module capable of decompressing the original element;
  b. decompressing the original element to destination elements and storing the destination elements in a destination archive structure;
  c. marking the original element for compressing;
  (iv) if the structural type is archive
  a. identifying an unpacking module capable of unpacking the original element;
  b. unpacking the original element to destination elements and storing the destination elements in destination archive structure;
  c. marking the original element for archiving;
  d. if the action indicates "link", obtain another element in the destination archive structure indicated in the patch instruction, and replacing the data of the element with the data of the other element in the destination archive structure;
  (v) if the original element was marked for archiving or for compressing, identifying all patch instructions having a location in the location of the original element, and executing steps (i) to (v) for each of the patch instructions having such location;

(vi) if the action indicates "add" or "update" execute patch application module on the destination element using patch data resulting in an updated version of the destination element;

(vii) if instruction action indicates "delete", delete the element; otherwise:

a. if the structural type is archive or the element was marked for archiving, identifying an archiving module capable of archiving the element, archiving the element according to an indication and/or metadata in patch instruction; and b. if the structural type is compressed or the element was marked for compression, identifying a compression module capable of compressing the element, compressing the element according to an indication and/or metadata in patch instruction.

In some embodiments, before step (v.), if the patch instruction indicates decoding, then:

(i) applying a matching decoding module to the element resulting in a decoded element, replacing the destination element with the decoded element, and marking the destination element for encoding;

(ii) after performing step (vii.b) if the patch instruction indicates encoding or the element was marked for encoding, applying a matching encoding module to the updated version, replacing the destination element with the updated version, and marking the destination element for encoding.

In some embodiments, the computing system generating a destination archive element is also based on patch applier policies.

In some embodiments, the patch applier policies comprise rules relate to: logical predicates regarding transformational modules; structural types; data types; properties of archive elements; logical predicates regarding patch applying module; or any combination thereof.

In a further aspect, the present invention relates to a compression computing system comprising: at least one processor; and at least one memory communicatively coupled to the at least one processor comprising computer-readable instructions that when executed by the at least one processor cause the computing system to implement a method of compressing a plurality of destination archive elements into a patch package comprising patch data and patch instructions, the method comprising:

(i) assigning destination archive element as a destination element in a matching pair, and a null indication as an original element in the matching pair;

(ii) for every destination archive element in the plurality of destination archive elements, perform:

a. identifying the structural type of the destination archive element, the structural type comprising "directory", "archive", "compressed" or "data", b. if structural type is "compressed", then A. identifying at least one decompression module compatible with the destination element;

B. applying the at least one decompression module to the destination element;

C. storing the results of B comprising of archive elements, each archive element being an internal archive element in a destination archive structure;

c. if structural type is "archive", then

A. identifying at least one unpacking module compatible with the destination element;

B. applying the at least one unpacking module to a destination archive structure comprising of archive elements, each archive element being an internal archive element;

C. storing the results of B comprising of archive elements, each archive element being an internal archive element in a destination archive structure;

d. updating patch data and a patch instruction in respect of the destination element, adding the structural type, identifier of the destination element, the identified at least one decompressing module if applicable and the identified at least one unpacking module as applicable;

(iii) repeating step (ii) for a plurality of the archive elements, each archive element being an internal archive element in the destination archive structure; and (iv) applying a selected compression module or differencing module to the destination archive structure; and generating a patch package comprising patch data and patch instructions adapted to reconstructing the plurality of destination archive elements.

In some embodiments, the computing system further comprises the step of packaging the destination archive structure into an archive using an archiving module before applying the selected compression module or differencing module in step (iv).

In another aspect, the present invention relates to a compression computing system comprising: at least one processor; and at least one memory communicatively coupled to the at least one processor comprising computer-readable instructions that when executed by the at least one processor cause the computing system to implement a method of compressing a plurality of destination archive elements into a patch package comprising patch data and patch instructions, the method comprising:

(i) assigning destination archive element as a destination element in the matching pair, and a null indication as an original element in the matching pair;

(ii) for every matching pair comprising of a null indication as an original element, and one archive element of the plurality of destination elements as a destination element:

a. identifying the datatype of the destination element and attempt matching a decoding module capable of transforming the destination element into a decoded data format;

b. if successful matching a decoding module, decoding the destination element into a decoded data format, and updating patch data and patch instructions accordingly;

c. storing in a destination archive structure the decoded data format as an archive element if available, and if not, storing the destination element;

(iii) packaging the destination archive structure into an archive using an archiving module if applicable; and (iv) applying a selected compression module or differencing module to the destination archive structure; and generating a patch package comprising patch data and patch instructions adapted to reconstructing the plurality of destination archive elements.

In some embodiments, the computing system further comprises the step of packaging the destination archive structure into an archive using an archiving module before applying the selected compression module or differencing module.

MODES FOR CARRYING OUT THE INVENTION

Figure 1A:
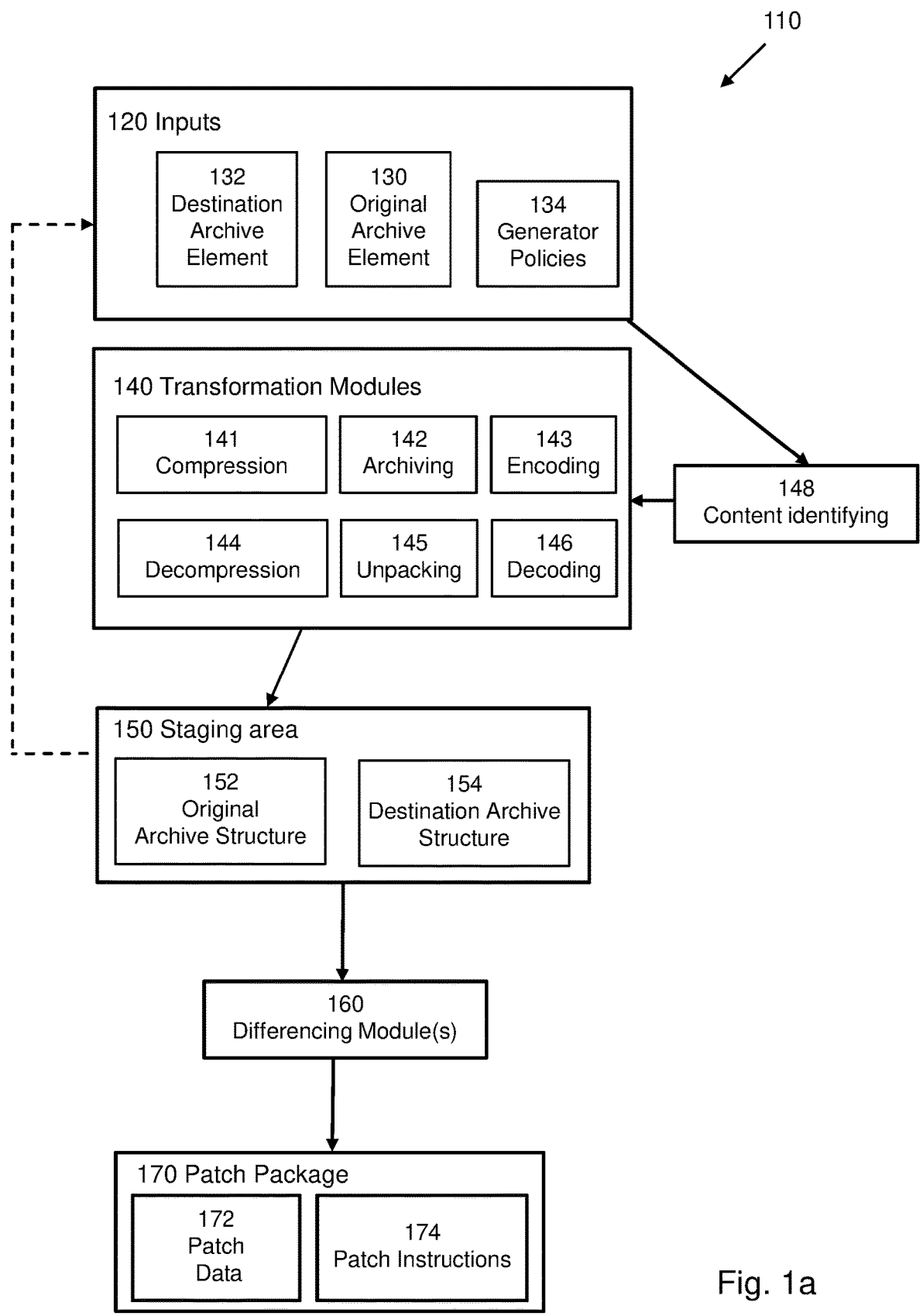
FIG. 1a is a block diagram of a patch generator according to an embodiment of the present invention.

In the following detailed description of various embodiments, reference is made to the accompanying drawings that form a part thereof, and in which are shown by way of illustration specific embodiments in which the invention may be practiced. It is understood that other embodiments may be utilized, and structural changes may be made without departing from the scope of the present invention.

Commercially available tools for performing incremental updates, differential updates, version control, versioning file systems and the like, typically review a first multitude of files/objects (that may be in any structural type form, i.e. compressed, archived etc.) to a later version of these files/objects. These differencing tools typically view the first version as one binary suite (unaware of the logical structure inside) to be compared to a second binary suite.

The present invention relates to systems and methods of creating and applying a software package (commonly referred to as "patch" or "patch package") that enables to more efficiently create an updated version of a software package, by applying the patch over the original software version. Embodiments of the present invention may require more resources, e.g., time, processing power and storage space, to prepare (create) a patch (compared to differencing modules of the art) as they spend more time analyzing the logical structure of each version, but the result is oftentimes a smaller and more efficient patch package.

The present invention also relates to systems and methods of compressing and decompressing a patch package, whether as an update or by using a single-archive input, as described below.

Industry Applicable Example 1

The software package "Eclipse" (originally by IBM™) was updated from version 4.18 (2020-12, downloaded over 1,600,000 times in April 2021) to version 4.19 (2021-03, downloaded over 1,200,000 times in April 2021). Version 4.19 was available on the eclipse.org only as a stand-alone download of the entire new version (no incremental or differential upload available from version 4.18), and the downloaded package size was about 341 MB.

An embodiment of the present invention created a patch package 170 to upgrade from version 4.18 to version 4.19. The size of patch package was only 13.5 MB, roughly 3.95% of the original size of version 4.19, meaning that the same server at the eclipse.org web site could send about 25 patches (serving 25 users) at the time it currently takes it to send a single package of the entire 4.19 version. This will reduce the costs of the web site's servers and communication lines and will increase user satisfaction as the download process will be faster for them.

By comparison, a patch package prepared using state-of-the-art "vcdiff" specification (xdelta3) was 59 MB in size for the same packages, or ~18% of the size of the full version of 4.19, and over 4 times larger than the package prepared by the present invention (59 MB compared to present invention's 13.5 MB).

Industry Applicable Example 2

The popular Android™ game "Clash Royale™" is very often updated for tens of millions (10,000,000+) of gamers, e.g., on the internet-accessible Google Play™ store. A May 2021 update of Clash Royale™ using a compressed .xapk-format compressed archive has a storage volume of approximately 141 megabytes.

An embodiment of the present invention created a patch package 170 to upgrade from a previous version 3.4.2 to then-current version 3.5.0. The size of this patch package 170 was only approx. 5.0 MB (megabytes), roughly 3.7% of the actual original size of version 3.5.0 released to the market, meaning that the same server at Google Play™ could send about 27 patches (serving 27 users) at the same time it currently takes it to send a single package of the entire 3.5.0 package. This reduction in patch size would reduce the costs of the web site's servers and communication lines and increase user satisfaction as the download process will be faster for them.

By comparison, a competing patch package prepared using state-of-the-art "vcdiff" specification (xdelta3) was 51 MB (megabytes) or ~38% of the size of the full version of 3.5.0 as sent by Google Play™ store, and approximately 10 times larger than the patch package 170 prepared by the present invention (51 MB compared to present invention's 5 MB).

Reference is now made to FIG. 1a showing an exemplary embodiment of generating a patch package 170. Inputs 120 may contain an original archive element 130 (also referred to as "source") and must contain at least one destination archive element 132 (also referred to as "destination"). Optionally, patch generator Policies 134 can be provided to specify preferences for how to generate the patch package 170.

Original archive element 130 is the original data structure to be updated (e.g., like a compressed archive ".tar.gz" comprising Eclipse version 4.18 in the example above), typically a multitude of files, sometimes arranged in several folders, some or all files can be compressed and/or archived.

An archive element can be classified as any one or more of the following 5 structural types:
1. "link"—a link is merely a pointer to another archive element, which in turn may also be in any of these 5 structural types;
2. "directory"—a directory (aka "folder") is a term used within a file-system that logically contains, or refers, to further archive element such as files, directories, archives and/or links; or when the logical elements of a directory reside in internal memory (as opposed to e.g., a hard disk type media) the directory is represented as a data structure in memory, such as an array, list, tree, hash table, hash map or any other similar data structure capable of containing or pointing to (e.g., by memory reference) to at least one or more internal archive elements;
3. "archive"—an archive is a structural type that indicates that an archive element is a combination of at least one other archive element contained within it as an "internal archive element". Unlike a "directory" structural type, the "archive" structural type actually packs together several other archive elements, and not merely points to or references them. In order to use the internal archive elements of an archive (view, edit, execute, as relevant) the internal archive elements first need to be unpacked from the archive, by using an unpacking module 145;

4. "compressed"—a compressed archive element is an archive element that has been reduced in size by previously using a compression module 141, as explained below; the archive element may be decompressed later by using a decompression module 144; or 5. "data"—an archive element of type data can be a file on a filesystem, an object in memory, a record in a database, and any logical equivalent that is not of the 4 above mentioned structural types.

Whenever a structural type is at least one of "directory", "archive" or "compressed" and thus capable of comprising at least one internal archive element(s), the corresponding archive element related classified by the structural type is defined as a "complex archive element", a term used in the description below for brevity.

Destination archive element 132 is the destination data structure result, that could be recreated by applying a patch package 170 in conjunction with the original archive element 130, e.g., using process 400. Like original archive element 130, the destination archive element 132 is of at least one of the same 5 structural types disclosed above.

Optionally, patch generator policies 134 may be used. These policies include a set of rules regarding how to perform processes 200 and 300 discussed below. Rules may include any logical predicates regarding transformational modules 140, structural types, content identifying module(s) 148, differencing module(s) 160, data types and properties of archive elements being processed by process 200 and process 300.

Transformation modules 140 are essentially codecs, or filters, of three major pairs types: compression-decompression, archiving-unpacking and encoding-decoding. Each one of the transformation modules 140 can take an input data and convert it into an output data, so that its pair module can take this output data and return it to the original input data. Transformation modules 140 pairs are: compression module 141 with decompression module 144; archiving module 142 and unpacking module 145; and encoding module 144 and decoding module 147. In addition, differencing module 160 and patch applying module 180 are also pair modules. Typically, in the industry, there is no clear distinction between a module that transforms data and a module that compresses or decompresses data; however, the present invention makes extensive use of such distinction.

For the purpose of the present invention, we will introduce an important distinction between modules that compress and decompress data, and modules that encode and decode data from one format to another. A first distinction we make for the present invention is that compression modules 141 can encode any input data comprising of binary bits into an output data often comprising fewer binary bits, while encoders 143 can only transform data in specific format(s) into output data in other specific format(s). Another distinction is that compression may be a lossy compression in which data elements are removed or mathematically approximated so the result is smaller in size, and hence after decompression the very original data may not retain its integrity, e.g., may not decompress into the exact identical format. For example, when transforming an image in bitmap format to a smaller size image in JPEG format, the quality of the image is reduced, and the original bitmap image cannot be reconstructed solely from the JPEG version. On the other hand, there is no data loss when encoding/decoding a file or an object, e.g., in a PNG format which retains all original image data.

For example, a popular compression module such as "brotli" (by Google™ Corporation) can transform any input, e.g., file, no matter its data contents, into an output, e.g., another file, that contains the brotli-dictionary and decompression instructions. However, a filter module such as "png2bmp" can only take data, e.g., a file, encoded in the publicly available "PNG" format and adhering to it, and can output its data only in one of the existing "bmp" formats.

We will now reference the transformation modules 140 available:

Compression module(s) 141 may be implemented in firmware, software and/or hardware and are capable of transforming input bits (e.g., a file, memory object, record or even a streaming bitstream), and convert these input bits into output bits that are oftentimes more efficient, e.g., smaller in size, than the input bits.

Note: the objective of a compression module is to produce an output that is smaller in size compared to its input. However, in some cases, the input file might not lend itself to be efficiently compressed by the algorithm(s) of the compression module used, and the resulting output (which includes some overhead of the compression, for example, a dictionary and decompressing instructions) might actually be larger than the input file.

Many of the compression module(s) 141 existing today are classified as "dictionary coders", which is key to the present subject matter for achieving some of its upgraded efficiency.

Popular compression modules that are dictionary coders include (alphabetically), Byte-pair codec and the Israeli LZ compression families LZ77 and LZ78 by Abraham Lempel and Jacob Ziv and their international derivatives: Brotli, Deflate, LZ4, LZFSE, LZJB, LZMA (xz), LZO, LZRW, LZSS, LZW, LZWL, LZX, as well as Snappy and Zstandard.

Other compression modules that are classified as "entropy coders" also result in output that is used by the present subject matter for achieving some of its upgraded efficiency. For the purpose of the present disclosure, all metadata, indices, tables (e.g., statistical and frequency tables) and any other non-instructive data generated by entropy coders shall be also simply referred to as "dictionary".

Popular compression modules 141 that are entropy coders include (alphabetically), Arithmetic-coding, more recently also in modules based on the Asymmetric Numeral Systems family of algorithms, Huffman-coding, and portions of Zstandard as well.

There are further compression modules 141 that are classified differently than the above, and typically yield more efficient (e.g., less) output bits than input bits. Examples of these last compression modules include BZip2, RLE, PPM and others. Whenever said further compression modules 141 use metadata, indices, tables and any other non-instructive data they generate, it shall be also simply be referred to as "dictionary" for the purpose of the present disclosure.

Encoding module(s) 143 are transformers (filters) that accept an input in one or more specific format(s), and process that input into output in another one or more specific format(s), so that the output is typically more efficient than the input.

An encoding module 143 is typically adapted to a specific context/topic or industry. For example, audio (sound) encoding modules 143 include modules outputting the audio formats such as: FLAC, MP3, QT, WMAL, and others.

Note that many encoding modules 143 for documents include a compression module 141, e.g., in their final stage, and use it for packaging multiple document elements into one document in compressed format. This present invention makes extensive use of this feature to arrive at better efficiency, e.g., compression, across multiple documents. Respectively, whenever encoders use compression module(s) 141 to package multiple document elements, a decompression module 144 can correctly extract the multiple document elements. Once extracted, each of the extracted elements may be further processed by a decoding module 146 module. Such formats include, inter alia, DOCX, ODP, ODS, ODT, OXPS, PPTX, XLSX, XPS and others.

Examples of encoding modules 143 in the field of computer graphics include modules outputting graphical formats such as: BMP, Exif, GIF, JPG (jpeg), PNG, PNM (PPM, PGM, PBM), TIFF, and others for raster graphics; AI, CGM, Gerber, SVG and others for vector graphics; AMF, DWG, DXF, FLT, IGES, VRML, xVRML and others for 3D vector graphics formats.

Examples of encoding modules 143 in the field of document processing may include modules outputting document processing formats such as: DOC, HTML, PDF, PPT, WPD, XLS, XML, and more; however, the formats used by contemporary versions of office suites such as OpenOffice (open-source) and Microsoft Office (by Microsoft™ Corporation), e.g., DOCX, XLSX and so on, are actually compressed formats that in the context of the present invention should be first processed by a decompression module 144.

Typically, any encoding module 143 such as the ones listed above, would have a corresponding decoding module 146. For a given format, more than one encoding module 143 may be available and also more than one decoding module 146 may be available.

Decompression module(s) 144 may be implemented in firmware, software and/or hardware and are capable of transforming input bits (e.g., a file, memory object, database record or even a streaming bitstream), and convert this input bits into output bits that are identical (in non-lossy compression) or equivalent (in lossy compression instances) to the input of a compression module 141. Example decompression module(s) 144 are provided to reverse the compression performed by any compression module 141, and are typically provided, e.g., bundled, with the compression module 141. Notable current examples include BZip2 (open-source), Gunzip (to decompress GZIP mentioned above) Inflate (to decompress Deflate mentioned above), LZMA and XZ e.g., as accessible via tools such as unxz and xz.

Decoding module(s) 146 are transformers (filters) that accept an input that was output from a matching encoding module 143, and process that input to generate an output. The output of the decoding module 146 is identical to the input received by the encoding module 143. By popular notion, a decoding module 146 generates its own output by reversing an output generated by said matching encoding module 143 into data identical to the input of said matching encoding module 143.

Typically, any encoding module 143 such as the ones listed above, would have a corresponding decoding module 146. For a given format, more than one encoding module 143 may be available and also more than one decoding module 146 may be available.

Archiving module(s) 142 can pack multiple archive elements, as defined above, of at least a "data" element, into a single archive element of the "data" structural type (e.g., a file or an object in memory).

Examples of popular archiving module(s) 142 in use at many fields in the computing industry include: tar (tape archive; a popular archive format on Unix systems, typically used as input e.g., to a compression module 141), ar (the traditional archive format of Unix systems), iso (An archive format originally used mainly for archiving and distribution of the exact, nearly-exact, or custom-modified contents of an optical storage medium such as a CD-ROM or DVD-ROM).

Unpacking module(s) 145 can unpack, or extract, multiple archive elements from an input archive element of the "data" structural type (e.g., a file or an object in memory).

When using a patch package 170 to transform an original archive element 130 to a destination archive element 132, in most cases it makes more sense not to modify (e.g., upgrade) an original archive element 130 directly, so that if the upgrade process is interrupted either voluntarily or accidentally, the older version of original archive element 130 would be intact and operational. Thus, most implementations would choose to perform the upgrade work in a separate location, staging area 150, and only after the upgrade is successful start using the destination archive element (optionally copying it to a different location) and cleaning up the installation files/objects that are not required anymore.

Unpacking module(s) 145 can typically unpack one or more archive elements from an input archive into a staging area 150; depending on the step, such unpacking is performed into the original archive structure 152 or the destination archive structure 154.

Content identifying module 148 is a specially crafted software, hardware and/or firmware capable of identifying "datatype"—the type of data contained within an archive element, by reading metadata describing it or by reading all or a portion of the actual data contained within said archive element.

Popular ways in the art to determine the datatype for an archive element are by testing the type versus "filesystem tests", "magic numbers" and language tests. For example, the popular operating system executable utility called "file" (in Unix) is an example of a system for detecting file-types by matching patterns of data within a file. More rigorous solutions exist, e.g., which may observe the actual contents of the file to determine its format, and in case they cannot, determine a format matching it as closely as possible.

Even more sophisticated content identifying module(s) 148 exist, taking into account more sophisticated analysis of the data, e.g., by decomposing a document archive element into document object model (DOM), by using format-dependent tailored components that can extract atomic data elements from the data, and so on. Patch generation system 110 may include more than one content identifying module 148, and said content identifying module(s) 148 may utilize a plethora of algorithms and components to carry out their task.

The staging area 150 is a logical unit that contains the storage space required for the operation of patch generation system 110 and patch applying system 112, accessible by processes 200, 300 and 400 in accordance with their specification.

Staging area 150 may be implemented in different ways: in a single location or divided across several storage media, e.g., to several databases, in a distributed database, in a single filesystem, in a filesystem spanning several storage media or several storage volumes, in RAM, in virtual memory, in on-chip memory caches, and so on.

The storage space required for the operation of patch generation system 110 may be prepared in advance as soon as process 200 or process 400 begins, or it may be allocated as process 200 or process 400 requires further storage space. Storage space claimed for a staging area 150 may be released after completing process 300 or process 400 or after steps utilizing its content have completed their execution.

Sometimes, the staging area 150 is defined directly on the same space allocated by destination archive element 132. In such cases, which are considered by many as risky, special considerations should be implemented to avoid data corruption of the destination archive element and of the patch package 170, for example, if the process is interrupted for any reason (voluntarily or accidentally), as is well known in the art.

The staging area 150 consists of at least one archive structure as specified below.

The original archive structure 152 and destination archive structure 154, comprise each of a set of zero or more archive elements in a traversable data structure (e.g., a tree, linked-list, hash map, filesystem etc.) as described below. Said zero or more archive elements may be accessible, within said each set, by using an archive element identifier as described below.

Differencing module(s) 160 are specially crafted modules that generate a technical description of the difference between two sets of data. Differencing module(s) 160 typically employ delta-compression algorithms to arrive at a patch data 172, which is typically referred to in the art as "delta", "delta update", "update", "payload" or "patch", and termed in the present disclosure as patch data 172.

Differencing module(s) 160 receive as input an original archive element 130 (source) and a destination archive element 132 (destination), and typically output delta-compressed differencing data, i.e., patch data 172, in respect of them.

A delta can be defined in 2 ways, symmetric delta and directed delta. A symmetric delta can be expressed as $$\Delta(v_1, v_2) = (v_1 \backslash v_2) \cup (v_2 \backslash v_1),$$

where $v_1$ and $v_2$ represent two versions, or in the context of the present invention, an original archive element 130 and a destination archive element 132.

A directed delta, also called a change or Update as discussed above, is a sequence of (elementary) change operations which, when applied to one version $v_1$, yields another version $v_2$. In computer implementations, they typically take the form of a language with at least two commands: copy data from v1 and write literal data.

Well known differencing module(s) 160 include: VCDiff as defined RFC 3284; Git repack as defined in the pack-format page of its documentation; BSDiff e.g., as defined by Colin Percival e.g., in "Naive differences of executable code" and multiple public code repositories worldwide; and even vintage modules like the "diff" command under Unix and Linux operating systems.

Many implementations of differencing module(s) 160 can only process a single archive element of the structural type "data", and thus special handling is performed by process 200 and process 400, both discussed below, to overcome this limitation and be able to cope with the diversity of structural types handled by the present invention.

Figure 1B:
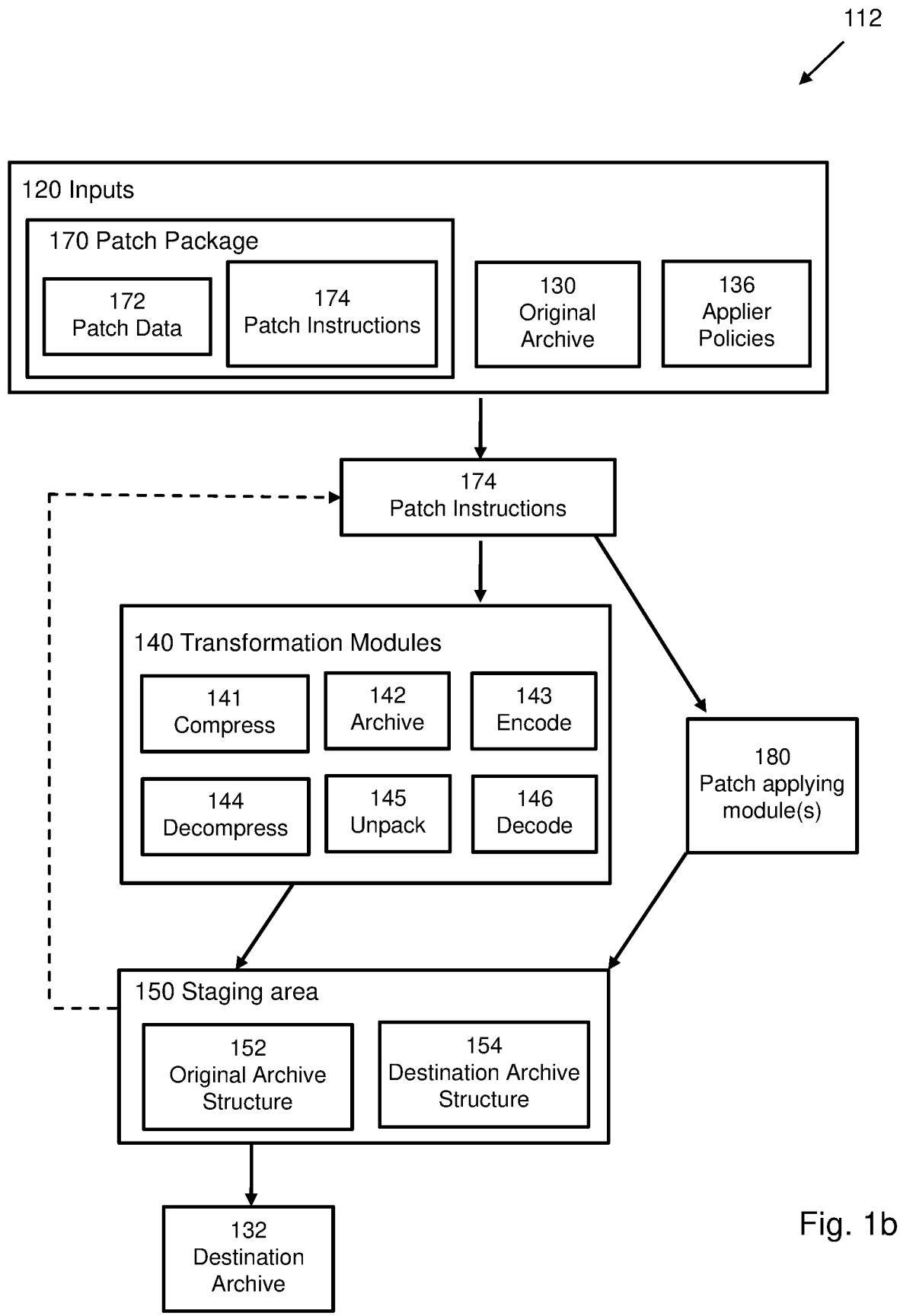
FIG. 1b is a block diagram of a patch applier according to an embodiment of the present invention.

Patch applying module(s) 180, shown in FIG. 1b, are specially crafted modules that can receive as input an original archive element 130 and patch data 172 and patch instructions 174, to reconstruct a destination archive element 132.

In some cases, patch applying module(s) 180 can receive only one archive element of the structural type "data". In other cases, patch applying module(s) 180 can receive multiple archive elements. In further cases, patch applying module(s) 180 can receive archive element of the "directory" structural type. In yet further cases, patch applying module(s) 180 may receive archive elements of an "archive" structural type. Lastly, in other further cases, patch applying module(s) 180 may receive archive elements of a "compressed" structural type.

Optionally, Applier policies 136 shown in FIG. 1b may be used. These policies include a set of rules regarding how to perform process 400 discussed below. Rules may include any logical predicates regarding transformational modules 140, structural types, data types and properties of archive elements being processed by process 400, as well as logical predicates regarding patch applying module(s) 180 and parameters passed to any module(s) used during process 400.

Well known patch applying module(s) 180 range from the vintage "patch" command on Unix and Linux operating systems, to more sophisticated modules such as xdelta3 for processing VCDiff patch data; bspatch for processing BSDiff-generated patch data, and so on.

Figure 2A:
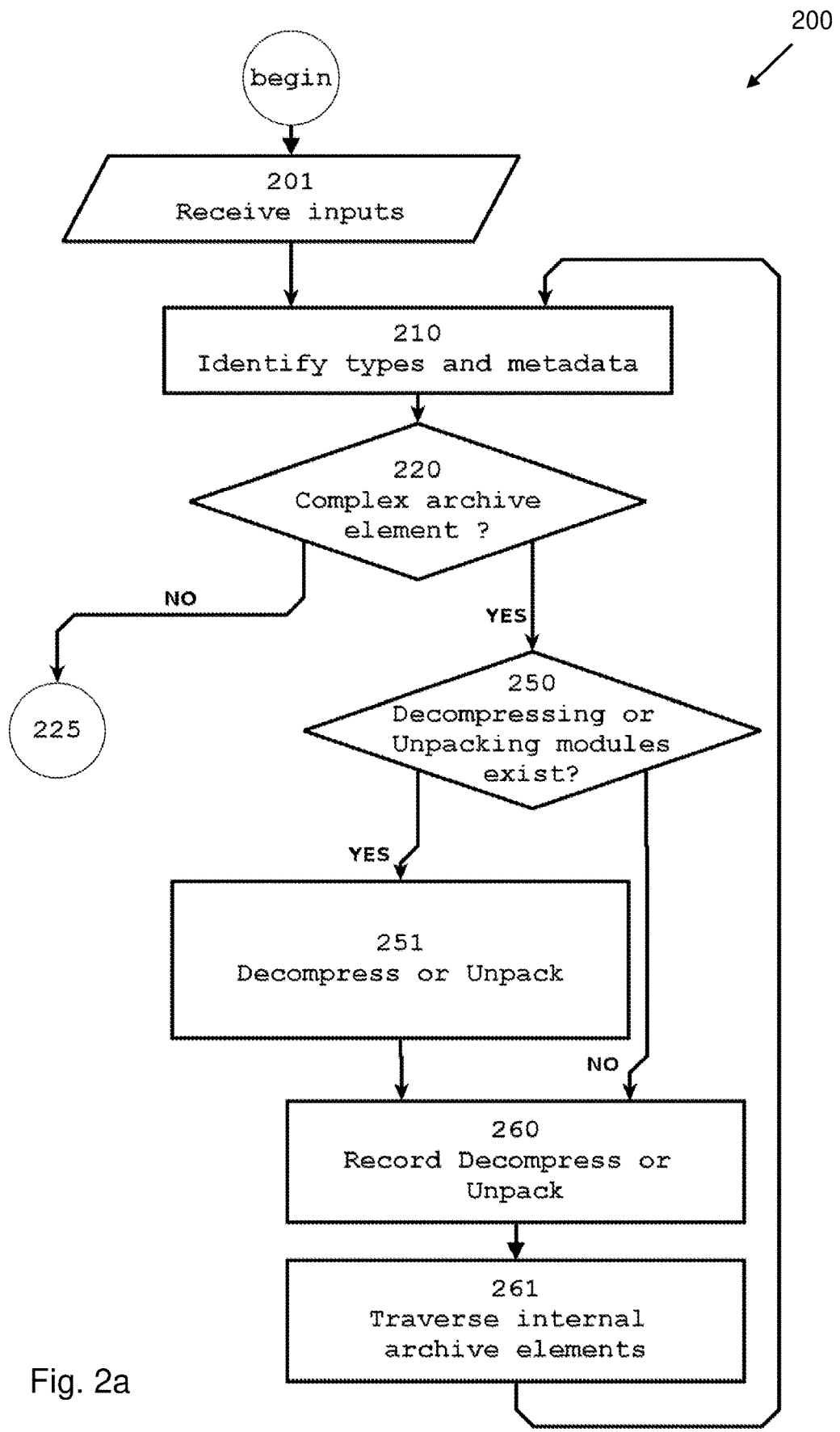
FIG. 2 is a flowchart of a process that traverses the original and destination archive elements to prepare for each a decoded archive structure, according to an embodiment of the present invention.
Figure 2B:
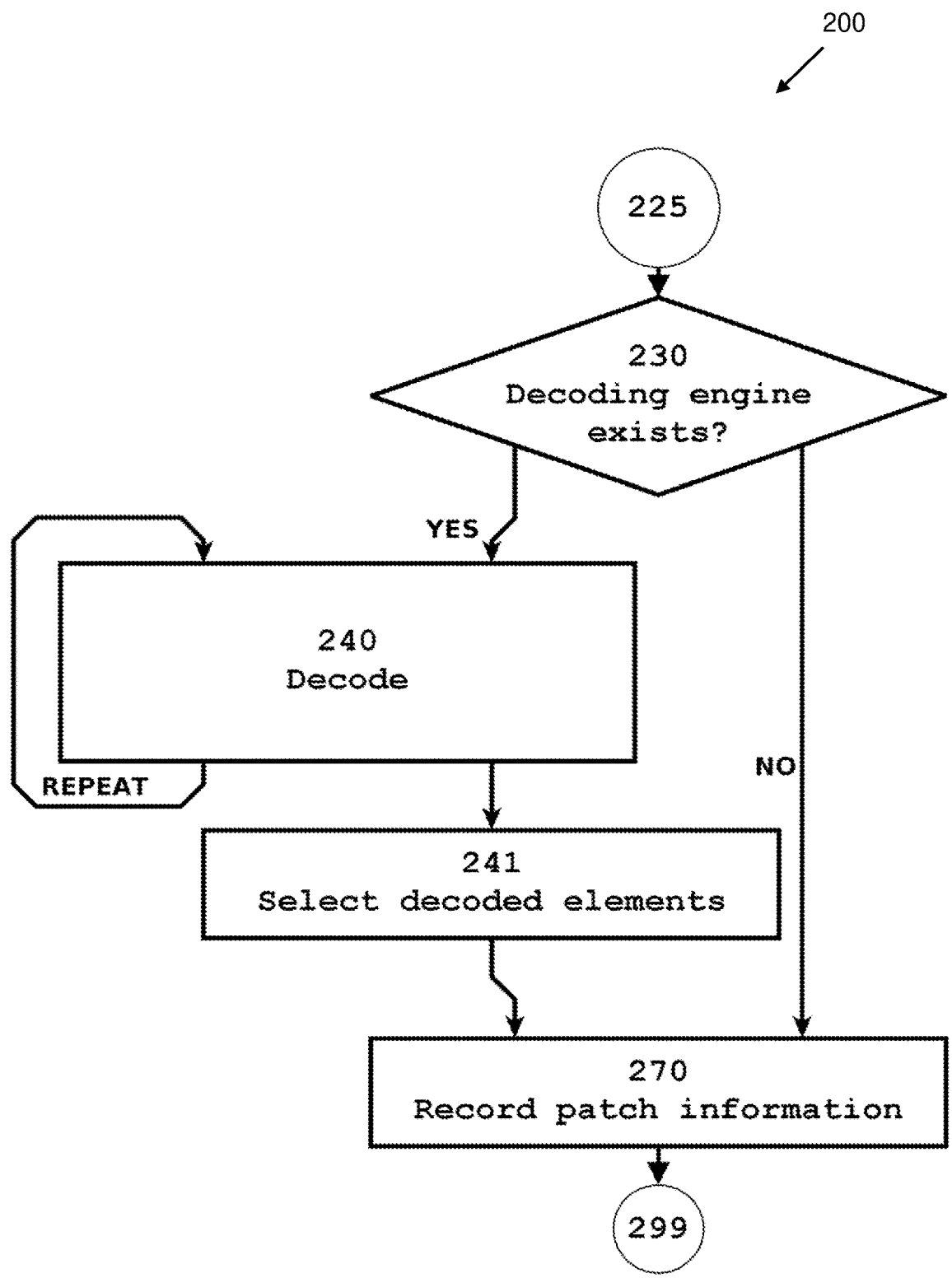

Reference is now made to FIG. 2 showing a process 200 that traverses the original and destination archive elements 130, 132 to prepare for each a decoded archive structure, according to an embodiment of the present invention.

Process 200 traverses the original archive element 130 and the destination archive element 132 to prepare for each decoded archive structures, preferably on staging area 150. Then, process 200 traverses each of said decoded archive structures, further unpacking, decompressing, and decoding archive elements contained therein.

The first two results of this process are an original archive structure 152 and a destination archive structure 154. Both comprise a set of zero or more archive elements in a traversable data structure (e.g., in a filesystem, a tree, linked-list, hash map etc.') as described below. Additional results are patch instructions 174, a set of patch instructions constructed by process 200 as it traverses original archive element 130 and destination archive element 132, as well as original archive structure 152 and destination archive structure 154. Patch instructions are constructed in relation to matching pairs comprising of one original element and one destination element, as well as in relation to matching pairs comprising of internal archive elements encountered within the original archive element 130 and within the destination archive element 132, e.g., in further execution steps of process 200.

Patch instructions are also constructed in relation to the structural type and datatype(s) of their respective archive elements, and may also include further data such as actions, selected decoding module(s) 141, selected compression module(s) 141 and metadata for their operations, as described in detail below. In the preferred embodiment, patch instructions 174 may be incorporated into a patch package 170 by process 200 as it makes progress, or alternatively or additionally by process 300.

Process 200 can run by one or more processors, in a recursive or in a progressive manner, e.g., by using heap memory, by using stack memory, and so on. In case process 200 is run using more than one processor or more than one processing core or thread, process 200 may execute steps in separate cores or threads, as applicable, e.g., by multitasking e.g., using a forking operation, by multi-threading, or otherwise, e.g., in order to process archive elements revealed during process 200 operation.

Process 200 can also be configured to run in different, possibly more complex arrangements or using different hardware, provided that its functionality, steps and results are maintained. Process 200 is typically performed by patch generation system 110.

In step 201, the patch generating system 110 typically receives, e.g., from a user or an application software, two main inputs, an original archive element 130 and a destination archive element 132, and optionally a patch generator policy 134 as well. These two main inputs are considered as a "matching pair" of archive elements. In general, most process steps are performed for a matching pair, and some process steps are performed for one archive element in the matching pair, or both archive elements in the matching pair.

Special embodiments exist where the original archive element 130 may be completely omitted, specified as 'null', or otherwise be indicated to patch generating system 110 it does not exist. Such special embodiments, typically resulting in a compressed format of the destination archive element 132, shall be described after the description of process 300.

Files, Records, Memory—When an input archive element is a file e.g., on a filesystem residing on a storage medium, the identifier of the input may be the full path to the input file, a relative path to the input file, a storage index number such as an MFT record or an i-archive element number (index archive element, in a Unix-style filesystem), and so on. In case an input is a memory location, the identifier of the input can be an absolute memory reference, a relative memory reference e.g., within a running context of a process on a designated processor and so on as applicable. In case an input is a record in a database, the input may be specified by using database-specific notation, or by using driver-specific notation (e.g., ODBC/JDBC database connection and database access notations e.g., with security credentials), by record number in a table in the database, by an ID of a database record in document databases, by an archive element ID in case of a graph database, and so on.

Locations—Usually, when executing process 200 for the first time, a first matching pair is constructed comprising an original element which is set to the original archive element 130 itself, and a destination element which is set to the destination archive element 132 itself. For example, destination archive element 132 may point to a compressed archive file "b.tar.gz".

However, in many cases process 200 may be executed by a patch generation system 110 or a patch applying system 112 with starting points that indicate more specific portions of an archive, e.g., only a portion of an archive. In these cases, process 200 shall construct a destination archive structure 154 for a subset of destination archive element 132. For example, destination archive element 132 may point to a directory "/images/pngs" within the compressed archive file "b.tar.gz", that is, with notation akin to "b.tar.gz:/images/pngs".

In general, the identifier of any archive element may indicate nested levels of containment, e.g., an identifier akin to "b.tar.gz:/images/pngs/2020-images.jar:/january/" will indicate a directory "january" contained within a .jar compressed archive file, where the .jar compressed archive file is situated in the "/images/pngs/" directory within the compressed archive file "b.tar.gz".

In the context of process 400, nested archived archive elements and compressed archive elements that may include internal archive elements, are oftentimes notated with a location identifier that uses such nested levels of containment. In such cases, process 400 may be required to at least recreate the nested location. To recreate the nested location, process 400 may subsequently process each nested level of containment in a location, and recreate the appropriate archive element using the correct structural type for each.

For example, in the above mentioned non-limiting example, a location for compressed archive "b.tar.gz" would be first recreated e.g. on destination archive structure 152, then a directory /image within said compressed archive, then another directory /pngs within the former /image directory, then next a jar compressed archive having the name 2020-images.jar, and finally a last directory /january within the jar compressed archive.

The nested locations need not be in their final format when recreated, rather, they could simply be specially crafted directories if destination archive structure 154 is on a filesystem, or as a relevant data structure in case destination archive structure 154 is in memory. Process 400 would typically transform every nested level to its correct structural type e.g., using transformation module(s) 140 as specified in process 400 below.

Allocation (PI)—Typically, step 201 would at least allocate storage space for the current patch-instruction 174 and patch data 172 on staging area 150. The patch-instruction 174 will be usable in process 400 in order to reconstruct the destination element by applying the current patch-instruction 174 to the original element using a patch application system 112, and in some cases using patch data 172 as well.

In step 210, the patch generating system 110 identifies which of the 5 structural types (disclosed above) are associated with the archive elements of the destination element and optionally of the original element. First, patch generating system 110 may identify structural types. Structural types have special consideration in patching process 400, in traversal process 200 and in packaging process 300, and affect the execution flow of said processes as well as their outputs. The 5 structural types identified by step 210 were disclosed above for original archive element 130.

Identifying Structural Types—There are many approaches to identifying structural types. Sometimes it is obvious from the input processed by step 210, e.g., when it processes archive elements through a relevant API such as a file-system API, it already has information of whether it handles a file or a directory. Patch generating system 110 may also naively examine the archive element's file extension in above mentioned example to attempt to identify its structural type, e.g., ".tar" for "archive" and "jar" for an "archive" that is further "compressed" using "Deflate" method.

However, such approaches may often fail if the data contained within an archive element is not read and compared against valid known data formats. Therefore, in step 210, in addition to identifying structural-types, step 210 may proceed to identify datatypes of archive elements by using content identifying module(s) 148 so that it has a higher certainty of correctly identifying the structural type, as well as having higher certainty of the format of the data in the archive element.

In addition, step 210 may also read any metadata related to the identified structural type and verify such metadata is compatible with a specification of the identified structural type.

Build a Patch Instruction 174—After identifying the structural type of the examined archive elements of the destination element and of the original element and any associated metadata, process 200 already has enough information in order to construct at least an initial patch-instruction 174 for the examined archive element, in respect of patching the original element to destination element, and may construct an initial patch-instruction (though this may be deferred to other steps as long as it is performed before steps 260 and 270). The patch instruction 174 is constructed as follows:

Actions—In case an original element is missing in the destination archive structure 154 (e.g., represented by a "null" pointer) an indication of a "delete" action is constructed for an identifier of original element is added to patch-instruction 174. In case original element is missing in the destination archive structure 154, an indication of an "add" action is constructed and an identifier of the destination element is added to patch instruction 174. Typically, when an archive element with an identical identifier exists, but at least one other property of said any archive elements is not identical both in original archive structure 152 and in destination archive structure 154, they may be indicated by constructing an "update" action and adding it to patch instruction 174.

Typically, when a destination element is missing in destination archive structure 154 in respect of an original element having an identical identifier, e.g., in case of a "delete" action, process 200 may proceed directly to step 270. In case one or more decoding modules 146 were identified by step 230, the patch generating system 110 continues to step 240; otherwise, it proceeds directly to step 270. In the specific case that both the original element and destination element are identical, though it is possible to indicate their action as "unaltered", such indication is redundant, and therefore it is typically more efficient (e.g., saves storage-space; saves execution time) to not include any action in a current patch-instruction when two elements are identical. The indications in respect of actions may be coded in a terse form to occupy less than 1-byte of storage space, or in an elaborate form, e.g., in UTF-8 string representing English language.

In case the structural-type is an "archive" type, it is typically useful to explicitly indicate in the patch-instruction 174 the datatype of that archive element, e.g., the data format of that archive element. It is advised to format said explicit indication of the structural-type by using a well-defined format indicator such as in an internationally accepted standard, e.g., using mime-types, an ISO definition, and so on, rather than simply relying on an ambiguous notations e.g., "BMP" which may be interpreted as different (albeit related) formats.

In case the structural-type is a "link" type, it is useful to include in the patch-instruction 174 an indication of which other archive element is linked to in/by the destination element, e.g. such as by including the identifier of said other archive element.

In case the identified datatype requires further metadata in order to be identically reconstructed by process 400, or in case it cannot be identically reconstructed by process 400, or to be reconstructed as similar as possible by process 400 as will be explained below—explicit indications of any further metadata is then added to the patch-instruction 174.

Some embodiments may have a default structural-type (e.g., "data") and choose to not indicate it in patch instruction 174 in order to save further space.

Datatype Example

By way of non-limiting example, consider a reference example we shall use to demonstrate steps 240 to 241, where an archive element in destination archive element 132 that has a corresponding other archive element in destination archive element 132 for its matching pair, was identified as a file containing PNG data contents. In this reference example, step 210 may identify the datatype of an archive element which is a file named "file1.png" as "PNG image data" by using content identifying module 148, and some of its metadata as, for example, "500×500, 8-bit/color RGBA, non-interlaced". However, both the PNG format and the BMP format already include sufficient information regarding the dimensions of an image, and therefore the first metadata "500×500" may not be explicitly required. In this case, a patch-instruction may be constructed so it indicates the following: {action=Update; Dtype="data"; name="file1.png"; metadata="8-bit/color RGBA, non-interlaced" }.

In step 220, the patch generating system 110 considers the structural types of the destination element and the original element, to determine whether any of them is a complex archive element that may contain internal archive elements, and in case they do, perform steps 250, 251, 260 and 261 according to the specification hereafter.

There are many examples of archive elements that may include internal archive elements. For example, documents saved by the popular MS Word application are saved in the DOCX format, which is essentially an adapted compressed archive file that uses the Deflate algorithm and compression module configured with specific execution parameters. This DOCX format can be decompressed e.g., by simply executing an "INFLATE" decompressing module 144 on the contents of the DOCX file or on the contents of a datastream representing a DOCX file.

In another example, an archive element is a file constructed by the popular "tar" Unix utility, which is oftentimes compressed by applying on it the "gzip" encoder. The result is a compressed archive file often having the (double) extension ".tar.gz" seen on many internet download websites. In this case, two transformation modules 146 and 144 should be used in sequence to transform such archive element, the first decompression module 144 one such as the "gunzip" utility on Unix computing devices, and a second decoding module 146 being the popular "tar" Unix utility with appropriate commands and/or flags.

In other cases, patch generating system 110 may encounter an archive element that does not immediately indicate the sequence of decoders necessary to decode it into its internal archive elements. Therefore, applying process 200 again (e.g., by recursion) to traverse the resulting internal archive element shall yield the expected result of fully decoding said archive element, as will be explained below.

In case inputs destination element or original element are complex archive elements, the patch generating system 110 performs step 250. Otherwise, and when destination element and original element are not complex archive elements, step 230 is executed (as indicated in the figure by a continuation indicator 225, to FIG. 2b).

In step 230, the patch generating system 110 attempts to identify at least one decoding module 141 that can decode the contents of the archive elements in the matching pair.

Since at this step the patch generating system 110 has already determined that destination element and original element are not of a "directory" or "archive" structural types, and that the transformation module(s) 141 that were identified are capable of transforming a given archive element into a decoded format, then patch generating system 110 has determined that destination element and/or original element may contain data encoded with some level of efficiency (e.g., compression).

Thus, the purpose of steps 230 through 241 is to transform destination element and/or original element into more elaborate archive elements, rather than more compressed. This goal may at first seem counter-intuitive, as it is in contrast to the way that professionals think of software packages, archives and Updates today, as well as how these are packaged and sent over networks today (e.g., internet downloads in the .tar.gz or ".cab" data-structures). It is also in contrast to the way that current document archives are kept (e.g., multiple but separate files each in the compressed DOCX data-structure).

However, these following steps are essential in order to later achieve higher efficiencies such as better compression rates or lower storage space requirements, as will be described below.

Steps 230 through 241 can increase the overall efficiency of process 200, but these steps are optional, and the process may be run without them.

Typically, step 230 selects a decoding module 146 that will provide the most elaborate version of the destination element wherever possible, e.g., the one describing the data in the form of discrete, atomic units as discussed below. Describing data in the form of discrete, atomic units, provides an opportunity for a differencing module 160 to locate identical data portions and encode them in process 300 (as discussed below) more efficiently than they were originally encoded in the destination element. Another way to select a decoding module 146 is to select one that will be able to process the most archive elements as possible using the same discrete, atomic units.

Atomic Units—The discrete, atomic units comprising an archive element are the ones describing the actual contained data, rather than the data arranged in a certain encoded format within said archive element, in case the archive element is in an encoded form already. For the purpose of the present disclosure, atomic units may be also defined as the data format in which a majority of data of a certain datatype may be technically described across two or more archive elements having an identical datatype.

For example, the discrete, atomic units in case of a datatype of computer graphics images can be the colored pixels comprising said computer graphics images. In this case, patch generating system 110 may select pixel-bitmaps as the atomic units to describe all or some of the archive elements comprising computer graphic images (e.g., including those in formats such as PNG, JPG and so on) and the data format for representing the archive elements as "image/bmp", if mime-types are used to indicate the data format.

Once it has selected at least one form of discrete, atomic units, patch generating system 110 depicts the appropriate decoding module 146 that can decode the contents of the destination element into a more elaborate form. patch generating system 110 may then include an indication of the selection of the elaborate format in the patch instruction 174, and may then include that certain encoded format, in order for process 400 to be able to reconstruct the destination element from the patch instruction 174 and original archive element 130. For example, include in the above example in patch instruction 174 {action=Update; name="file1.png"; metadata="8-bit/color RGBA, non-interlaced"} further indications updating the example patch instruction 174 into {action=Update; name="file1.png"; metadata="8-bit/color RGBA, non-interlaced"; format="PNG"; encoding="image/bmp"}.

Multiple Decoding Modules—Up to this point, step 230 has identified a single decoding module 146. However, there are circumstances when a preferred output data format cannot easily be determined, e.g., which decoding modules 146 will result in the best efficiency once a differencing module 160 has been applied to it. In those cases, step 230 may select two or more decoding modules 146, and step 240 will then adjust as specified below.

Sometimes, patch generator policies 134 may include rules for guidance in the selection of decoding modules 146. For example, mandate a given decoding module 146, specify certain parameters or options to be used, forbid a given decoding module 146, etc., possibly taking into account resources available at the computing device executing the patch package 170 or known constraints at that computing device.

In step 240, after step 230 has succeeded identifying at least one decoding module 146 that can decode the contents of the original element and destination element into a decoded form, by applying for each the identified at least one decoding module 146, and construct a decoded destination archive element per each decoding module 146 used, on the staging area 150.

When decoding an original element, the resulting output of decoding module 146 may be placed into a decoded original element 130 within original archive structure 152, in the staging area 150. The decoded original element may then replace the original element in subsequent processing, i.e., in the matching pair containing the original element.

When decoding a destination element, the resulting output of decoding module 146 may be placed into a decoded destination element within destination archive structure 154 in staging area 150. The decoded destination element may then replace the destination element in subsequent processing, i.e., in the matching pair containing the destination element.

Reference is made to the non-limiting reference-example described in step 210, in which an archive element (e.g., destination element) was identified as computer graphics in the PNG format. patch generating system 110 may select a decoding module 146 identified by "png2bmp" that can decode PNG-encoded input into an output in the BMP format, a format which may detail every single pixel in the graphics as its data. It will then decode the destination element into a decoded destination element using decoding module 146 named "png2bmp" onto destination archive structure 154, and decode original element into a decoded original element using decoding module 146 named "png2bmp" onto original archive structure 152.

When any resulting decoded archive element was constructed, steps 230-240 may repeat with the constructed decoded archive element as input, until no more decoder(s) 146 are identified. In some embodiments, it may be sufficient to indicate only the last decoding module(s) 146, leaving it to the patch applying system 112 to determine a sequence of required encoding module(s) 143 to regenerate its encoded form. In other embodiments, all said repetitions may be recorded in patch instruction 174.

In step 241, the patch generating system 110 selects the last decoded form from the decoded original archive elements and the decoded destination archive elements as the matching pair to retain. At this point, step 241 may dispose (e.g., delete or release from staging area 150) any other decoded original and destination archive elements.

This may be performed in accordance with rules in the patch generator policies 134, or as configured in the patch generating system 110, or by selecting the only existing decoded form in case only one set of decoded original and destination archive elements exist, e.g., if only one decoding module 146 has been used.

Patch generator policy 134 rules may use any readable property of the resulting decoded original archive element and decoded destination archive element. For example, a simple rule would be to select a given decoder 146.

One or more rules may be constructed directly into the implementation, so they are "hard-coded" into patch generating system 110 and need not be in accordance with patch generator policies 134.

Depending on the implementation preferences and embodiment, step 241 may be required to perform 'housekeeping' steps, including removing all destination archive elements 132 other than the selected element, reclaiming memory and/or storage space, e.g., on the staging area 150, and so on. These housekeeping activities may also be performed anytime in subsequent steps such as steps 241, 252 or 299.

The patch generating system 110 then adds metadata describing which decoder 146 was used and any further metadata required, and the original format of the destination element to the patch-instruction. In some embodiments, metadata concerning the original element may be added as well, but such information may be deemed as redundant for most purposes.

In some embodiments, steps 230 to 241 occur only after the entire destination archive structure 154 has been extracted, so that the selection process of the at least one decoding module (module) 146 can take into consideration the entire set of internal archive elements discovered by process 200. These embodiments may yield a more efficient patch package 170 in case there is more than one elaborate format describing the internal archive elements with discrete, atomic units.

In other embodiments, steps 230 to 241 occur during every iteration of process 200, as described in FIG. 2. These other embodiments may yield a more efficient patch package 170 in case there is only one elaborate format available to patch generating system 110 describing the internal archive elements.

In step 270, the patch generating system 110 records the patch instruction 174, which should now include an identifier of the original element and/or an identifier of the destination element; the identified structural and/or datatype types of destination element; an action to be taken as described above; optionally, metadata required to reconstruct the destination element from the original element; optionally, metadata describing which decoding module(s) 146 were used; and optionally, the original encoded format of the destination element to the patch-instruction 174; as minimally required to reconstruct said most elaborate form of the destination element from the original element as applicable.

We now turn to the other branching from step 220, occurring when identifying that the structural types of destination element or original element are a directory or an archive.

In step 250, the patch generating system 110 considers the structural type of each archive element in the matching pair, i.e., once for the original element and once for the matched destination element. For each archive element in the matching pair, when the structural type is "archive", step 250 attempts to identify at least one decompressing module 141 or unpacking module 145 that can extract the internal archive elements contained within the original element and within the destination element.

In step 251, patch generating system 110 first assures that said action in step 220 does not represent "delete", so that patch generating system 110 can now use the at least one decoding module(s) 146 or unpacking module 145 identified in step 250 to decode or unpack the destination element on the staging area 150, and to decode or unpack the original element on the staging area 150.

The results of this step are typically one original archive structure 152 for original archive element 130 and one destination archive structure 154 for destination archive element 132, each comprising internal archive elements unpacked from their respective archive elements 130, 132.

Reasoning Behind Steps 230-251:

While a mathematical discussion of the following is beyond the scope necessary to understand the present invention, a more mathematical discussion is planned to be provided in later academic journal papers for the scientific and engineering communities. We present a brief explanation of the reasoning and benefits of steps 230-251 below.

Oftentimes, compression modules 141 construct at least one internal dictionary mapping original data into (typically shorter, or "more efficient") compressed data, e.g., using statistical recurrence models. This dictionary is then stored within the compressed data along with instructions on how to use it, e.g., by a matching decompression module 144.

When multiple archive elements are archived, e.g., in an update patch 170 of a large software package or a set of documents stored for archival, some of them are typically already in a compressed form. Case in point is the publicly available software package of Eclipse version 4.19 released in 2021-03, where a plethora of "jar"-typed files were distributed in one large package, each "jar"-typed archive element being an individually compressed archive of internal archive elements that are typically java classes object code.

When examining multiple archive elements that were compressed individually, and then archived together, one may observe that each such archive element will typically have its own dictionary and its own instructions on how to use that dictionary to reconstruct the original data.

However, if we consider a set of related archive elements, such as multiple "jar"-type archives packaged together to be sent over communication networks, it can be shown that many portions of the original data as a whole, across the multiple "jar"-type archives, are identical. In case original archive structure 152 and destination archive structure 154 were decoded from a compressed archive element, a differencing module 160 operating on these archive structures would now have the opportunity to operate on the original data of every internal archive element, rather than the already-compressed data comprising the destination element or the original element.

One key, therefore, to achieve better efficiency (e.g., compression) is by transforming two or more such related archives that were packaged together in order to prepare less dictionaries, ultimately only one dictionary per the entire patch package 170, so said less dictionaries sufficiently describing all archive elements.

This extraction of the internal archive elements is useful and beneficial in several ways, of which we shall highlight three major advantages:

(1) A first benefit is providing an opportunity to a differencing module 160 to find data portions that are identical across two or more internal archive elements, but not necessarily occurring often within one of the internal archive elements. By way of a non-limiting example, consider a set of hundreds of photographs, all taken by the same camera model and same image dimensions (e.g., 2000×3000 pixels). Although this data may repeat only once per internal archive element, it repeats across the plethora of internal archive elements, and thus a differencing module 160 computing repeating data portions may now have the opportunity to consider that data as repeating data portions. Similarly, long pixel-strips of the same color may exist among several such images; however, when compressed individually, such long pixel-strips may recur very few times, e.g., just once.

(2) A second benefit is providing an opportunity to a differencing module 160 to reduce the number of dictionaries (e.g., maps, frequency tables, and so on) mapping data portions in the internal archive elements. Typically, each internal archive elements is compressed in separate (e.g., as separate ".xz" or ".pptx" file) and thus contains its own dictionary. However, when computed together by a differencing module 160, there is an opportunity to reduce the number of dictionaries, oftentimes even to just one dictionary shared by two or more internal archive elements.

(3) A third benefit is identifying repeating internal archive elements across all internal archive elements. Consider, for example, a set of presentation documents in the ".pptx" format, all belonging to the same department at the same organization, and thus having identical multiple images such as company logo and departmental "themes" comprising color definitions, font definitions, background images, headers and footers, and so on, that are encoded and/or compressed individually per file. In case there are such repeating internal archive elements among internal archive elements, at least the following two improvements can be introduced:

(3a) First, patch generating system 110 shall have the opportunity to indicate the repeating internal archive elements by maintaining only the first of the repeating internal archive elements, while indicating the rest of the repeating internal archive elements, in patch instructions, as "links" to the first of said repeating internal archive elements. When repeating internal archive elements are still in compressed form, their existence is not visible to a differencing module 160, as it merely sees the compressed data, which would look different across different compressed archives.

(3b) Second, once the repeating archive elements were extracted by process 200, by serving as input to steps 230-251 they, in turn, may contribute to the first benefit and the second benefit described in this step.

In step 260, the patch generating system 110 adds all metadata required for process 400 to correctly recreate the destination element according to the patch-instruction 174. Subsequentially, step 260 records indications of the decompression module(s) 144 and unpacking module(s) 145 used in steps 250-251 in said patch instruction 174.

In step 261, the patch generating system 110 constructs a new set of matching pairs, each comprising an original element and a destination element, where each matching pair corresponds to an internal archive element unpacked or decompressed in step 251.

This new set of matching pairs is typically constructed by traversing all internal archive elements unpacked and decompressed in step 251 and finding identical identifiers in both. Typically, one loop will iterate over every internal archive element in the original archive structure 152 and match it with one internal archive element having an identical identifier in the destination archive structure 154. Whenever identical identifiers are matched, a matching pair is constructed by step 261.

Typically, a second loop would iterate over at least the remaining (non-matched) archive elements in the destination archive structure 154, and whenever an identical identifier is matched in the original archive structure 152, a matching pair is constructed by step 261.

Once a matching pair is ready, said matching pair is used as new input, and steps 210 to 270 are executed with said new inputs as a new matching pair in their respect as original and destination archive elements. In a preferred embodiment, this is repeated by step 261 until no further unpacked or decompressed internal archive elements are found in step 250, e.g., in a recursive manner.

In some embodiments, patch generating system 110 may use rules e.g., in applier policies 136 to determine when to pass a matching pair as new input to steps 210 to 270, and when to avoid doing so.

Once all required (e.g., by generator policies 134) internal archive elements were unpacked and decompressed, process 200 executes steps 210-260 again for each of the required internal archive elements, as indicated by the patch instructions 174.

In step 270, the patch instruction 174 and patch data 172 are ready, and may be recorded in their final form, inclusive of any required metadata as explained above, in patch package 170.

In some embodiments, step 270 may check whether any previously encountered patch data 172 is identical to the ready patch data 172, and in case it is, instead of recording said patch data 172 in patch package 170, adapt the patch instruction 174 with a 'link' structural-type and with an indication referencing said previously-encountered patch data 172, thus saving recording the same patch data 172 more than once.

In some embodiments, well-known housekeeping operations may take place as required for a smoother execution, including assuring enough storage space is available, enough memory space is available and the removal of intermediate artifacts not required for subsequent steps and processes (e.g., process 300). Such housekeeping operations are well known in the art, and include, inter-alia, disposal of heap memory allocations; releasing file handles and so on; process-related housekeeping operations such as releasing or deleting the destination archive element 132 after step 251 or step 241; releasing or deleting the original archive element 130 after step 251 or step 241; and so on.

In further embodiments, performing process 200 more than once, e.g., in a recursive manner, e.g., using original archive structure 152 and destination archive structure 154 as inputs to the recursion, may guarantee that any archives and compressed archive elements contained in original archive element 130 and/or in destination archive element 132 and/or in any internal archive element comprising either of them and discovered in the traversal are respectively, in their turn, unpacked and decoded, so their internal archive elements are extracted from them. This is a critical property of many embodiments of the present subject matter, oftentimes enhancing the efficiency of a patch package 170. Though in the preferred embodiment or optimal execution, process 200 decodes and extracts every single archive and complex archive element, some constraints may be imposed on its operation, for example, by imposed generator policies 134 so only a subset of the archives or complex archive elements will be decoded or have their internal archive elements traversed.

Typically, such constraints may be imposed by including rules in the patch generator policies 134. Examples of such rules include, but are not limited to the following kinds of constraints:

1. A constraining rule, where the level of traversal is restricted to N levels, e.g., in a DFS or BFS traversal algorithm employed by patch generating system 110.
2. A constraining rule, limiting the data formats of complex archive elements, e.g., to data formats of tar.gz, bz2, jar and xz;
3. A constraining rule, limiting the data formats of archives, e.g., to data formats of tar and ar;
4. A constraining rule, limiting the traversal to only complex archive elements, only archives, or a combination of them;
5. A constraining rule, governing when process 300 should operate over the traversed data, e.g., by limiting the amount of storage to traverse before operating, by limiting the number of complex or archive elements that have been traversed; and so on.

Further constraining rules may be described in patch generator policies 134, according to the specific configuration of hardware, firmware, software, storage, operating system and file systems on which the patch generating system 110 operates.

Figure 3:
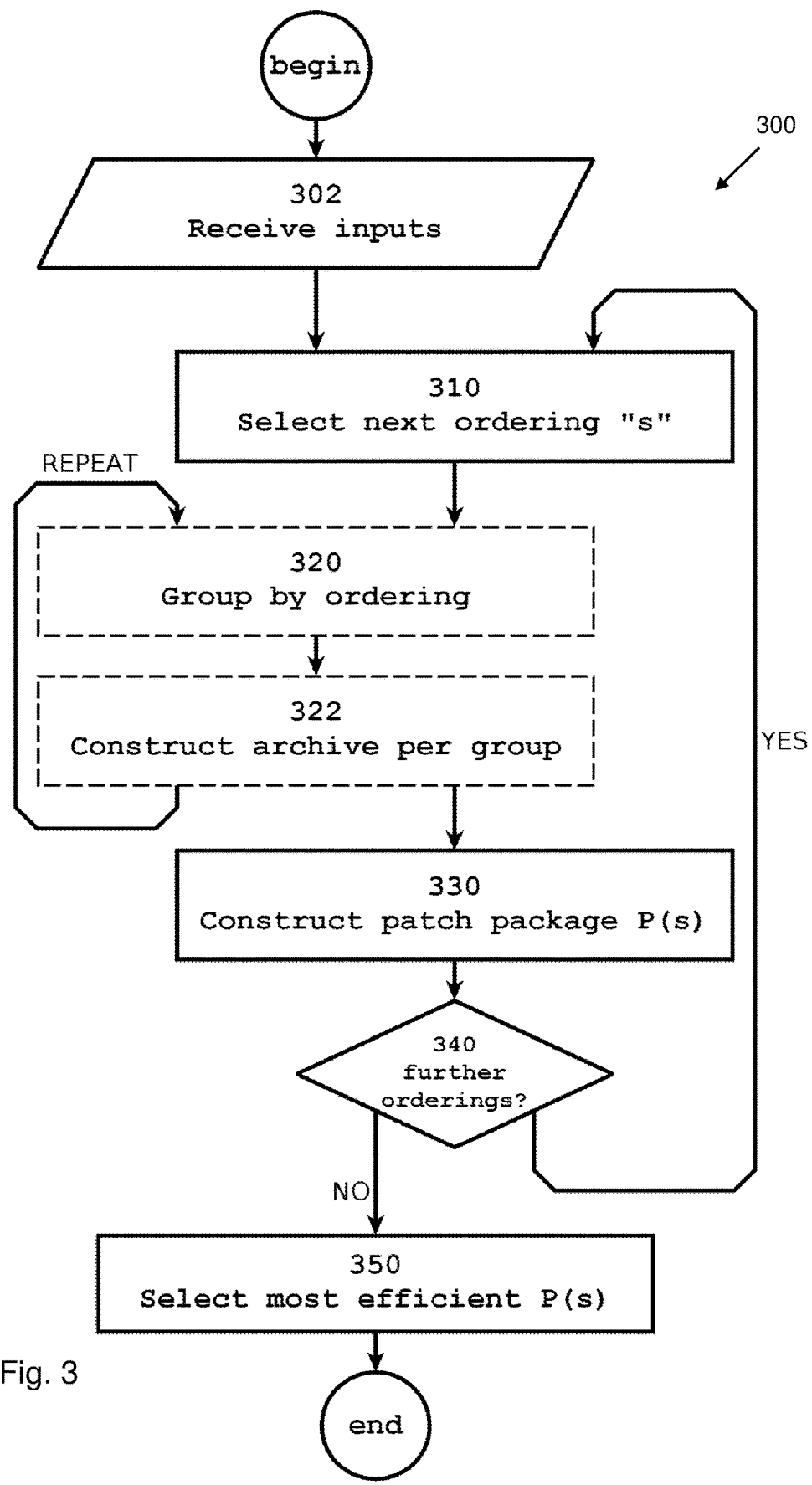
FIG. 3 is a flowchart of a process for traversing a matching pair of archive elements, typically destination and original archive structures and construct an efficient patch package.

Reference is now made to FIG. 3 showing flowchart of a process 300 for traversing a matching pair of archive elements, typically destination and original archive structures 152, 154 and constructing an efficient patch package 170, according to embodiments of the present invention.

Hardware Limitations—The preferred embodiment of process 300 typically requires a volume of RAM and/or storage media that is manyfold the size of the original archive element 130 and/or manyfold the size of the destination archive element 132. The actual volume required will be subject to numerous factors, including, inter-alia, the decoding modules 146 selected; the compression level used to create the original archive 130; the compression level(s) used by compression module(s) 140; other parameters used to execute compression module(s) 140 and so on.

The preferred embodiment of process 300 is described herein as running only once, e.g., in the final iteration (recursion) of process 200, or right after a selected step of it. However, one skilled in the art may easily construct other embodiments having a decoded execution sequence of steps, e.g., by calling process 300 after completing step 252, or step 253; or e.g., by multitasking the operation of process 300 for different locations in destination archive structure 154 and/or different locations in the original archive structure 152; or among two or more hardware processors or virtual processors; or e.g., by performing steps in process 200 and in process 300 in an interleaving pattern, so that portions of the generated destination archive structure 154 are traversed and decoded by process 200 and then reconstructed by process 300 as described below, and so on. These other embodiments may prove useful, especially if operating in an environment with constraint resources, such if the volume of RAM and/or storage media for the staging area 150 are too limited for running the preferred embodiment at one pass, as well as for utilizing more than one processor for preparing parts of a DAT being processed, whether the destination archive structure 154 or an original archive structure 152.

Process 300 optionally includes multiple passes, essentially loops or recursions, as specified below in a preferred embodiment. Each pass is associated with a different order selection (designated by the letter "s" herein and below) of archive elements of the destination archive structure 154 in each patch of target element constructed using ordering identified by "s" (hereinafter in short $P_S$) according to the teachings below. At the first pass of process 300, which may be identified by s=0 for example, a patch package 170 for the original ordering of destination archive element 132 and original archive element 130 are computed. The patch package 170 resulting from said first pass may therefore be referred to as "$P_0$".

As the archive elements traversed by process 300 in destination archive structure 154 or original archive structure 152 are not necessarily identical to destination archive element 132 nor to original archive element 132, we use different notation in process 300 to differentiate between internal archive elements originally appearing in the original archive element 130 and destination archive element 132 ("original archive elements"), and the internal archive elements resulting from process 200.

Goals and benefits—While the mathematical grounds are beyond the scope required by someone skilled in the art to construct an embodiment of the present subject matter, we will briefly highlight a few points that relate to benefits and/or efficiencies gained by performing process 300 over destination archive structure 154.

One of the goals of process 300 is to reduce the overheads that may be associated with having a plethora of discrete dictionaries, when two or more original elements or destination elements are in compressed forms.

Another goal of process 300 is to attempt at arriving at better compression results by inputting compression modules 141 and/or encoding modules 143 with a larger diversity or amount of data, typically resulting in different albeit fewer dictionaries in patch data 172.

Yet another goal of process 300 is to attempt at arriving at better compression results by inputting compression modules 141 and/or encoding modules 143 with archive elements in a different order than a trivial or default traversal algorithm would input them.

A further goal of process 300 is to attempt arriving at improved compression efficiency by replacing a less-efficient original encoded patch data 172 with patch data 172 that is more efficiently encoded by different compression module(s) 141/encoding module(s) 143 or by the same encoding module 143 executed with different parameters (e.g., compression level, dictionary size, type of "match finder" e.g. in algorithms XZ and/or LZMA and so on).

Process 300 then attempts to select the most-efficient Patch data 172 ("MEP") by considering the efficiencies (whether absolute or relative) of the different alternative patches 170 it constructs.

There are several benefits gained from executing steps 310-340, which partially addresses some of process 300 goals.

(1) By constructing alternative patch packages 170 ($P_S$), a more efficient compression than the original compression, e.g., for $P_0$, may be found.
(2) By constructing alternative patch packages 170 ($P_S$), several original archive elements that were previously compressed, e.g., in destination archive element 132, may now be compressed with less overhead data, e.g., less data dictionaries that were required per single original compressed archive element.
(3) Constructing alternative patch packages 170 ($P_S$) by inputting transformation module(s) 140 with an alternative arrangements of internal archive elements, may also result in two main benefits:

(3.1) an alternative dictionary, which describes the data of the internal archive elements more efficiently; and (3.2) identical archive elements (e.g., as internal archive elements of different compressed archives) and thus not being discovered as identical by the differencing module 160 (due to being differently represented due to differences in dictionaries), are now visible and can be either better compressed or be replaced by a referral to a link to the first occurrence. For example, assuming 20 occurrences of the same archive element were discovered, the first archive element can be compressed and saved as such, while the remaining 19 occurrences will not be written in a compressed form, but rather as a link to the first occurrences containing the compressed form of the archive element.

Above mentioned goals of process 300 may be sought for in full or partially, depending on numerous factors, including but not limited to: the actual steps included in an embodiment that is implemented; the transformation module(s) 140 used to create $P_S$; the transforming module(s) 140 used to create $P_S$; the parameters used when executing transformation module(s) 140 over the set of internal archive elements; and so on.

In step 302, the patching system 110 is input with a matching pair comprising of two data streams, an original element and a destination element.

If process 200 was executed prior to executing process 300, both input data streams are starting points for processing the two archive structures 152 and 154 resulting from process 200; otherwise, the starting points are treated as the original and destination archive elements 130, 132 themselves.

Similar to process 200, the first input location in the original element 130 is the initial position in the original archive structure 152 to read archive elements for comparison from, or a reference to it. The second input location in destination element is the initial position in the destination archive structure 154 to read archive elements for comparison from, or a reference to it.

Similarly to process 200, process 300 may also be input with only one input location. Such cases are described below as "single-archive input" cases after the description of process 300.

In step 310, the patching system 110 should select an ordering of internal archive elements. This step is key to achieving further efficiency, e.g., compression, for the resulting patch data 172.

It is noted that in process 200, the patching system 110 prepared archive structures that contain unpacked and decompressed archive elements.

The idea of ordering is for creating alternative patch packages 170, each one created by running a different ordering of matching pairs as input to a module. Each ordering is generated according to two selections-one is the "sequencing" of matching pairs, and the other is the "grouping" of a sequencing of matching pairs into sub-groups.

An ordering may include a rule stating whether the purpose of process 300 is differencing or compression, i.e., to execute a differencing module 160, a compression module 141 (e.g., in case of a single-archive input as described below) or both.

Patching system 110 performs this by taking the archive elements constructed by all previous process steps, and permutating their order of input, as explained below.

To permutate the order of archive elements in the sequence, a query may be used to create a result set of archive elements that fit it as output. A subsequent step (or if possible, within the query) will group matching pairs of archive elements according to one or more grouping criteria.

There are numerous ways to sequence and group archive elements. Patching system 110 can be built to accommodate any sequencing and grouping that can be defined in a set of rules. Some examples include:

1. Natural order—Matching pairs of archive elements are added to the differencing module 160 (or compression module 141) as they are read from their respective locations, e.g., original archive structure 152 and destination archive structure 154. This is typically used for constructing the first $P_S$ ($P_0$).
2. Sorted order—Matching pairs of archive elements are sorted according to criteria, e.g., in generator policies 134. The criteria can be for any property of the archive elements, e.g., by size, by parent directory name, by filename, by datatype and so on. For example, sort by file-size to construct a dictionary of the largest files first.
3. Typed-order—Matching pairs of archive elements are grouped according to their identified datatypes. For example, input all BMPs first, then XMLs.
4. N-off—Matching pairs are grouped according to a property of their archive elements, e.g., datatype, first letter of filename, and so on, sorted in ascending or descending form, and then the Top-N are selected. For example, matching from largest size to smallest size all archive elements according to their datatype, in groups of 5, will yield grouping of e.g., for an archive structure containing only archive elements of 2 datatypes (BMP, XML), it shall return the 5 largest BMPs first, followed by 5 largest XML documents, followed again by next largest 5 BMPs, followed by 5 next-largest XMLs, and so on.
5. Patch-instruction element—Elements within the patch instruction 174, and in particular, required metadata, can play an important part in grouping and sequencing.

Permutations can be done according to any set of rules and preferences, and are not limited to a single rule, rules may be combined in any sequence. In addition, an ordering may permutate the actual transformational modules 140 and differencing module(s) 160 used, even in case an identical sequence of archive elements is used. This way, results for different differencing modules 160 and/or for different compression modules can be created by the system.

When first executed, step 310 simply selects a first ordering. If only one ordering is specified for the patching system 110, e.g., in patch generator policies 134, or "hard-coded" into its process, then it selects this one. Otherwise, it determines, with the aid of patch generator policies 134, which ordering should come up next.

When next executed in further iterations, step 310 will compute the next ordering coming up from the set of rules e.g., in patch generator policies 134.

In step 320 the patching system 110 groups all archive elements, in accordance with the relevant rules in the current ordering, into distinct sequences of archive elements. These sequences of archive elements shall be used to construct a patch package 170 in step 330.

Archive elements may be grouped by using one or more different axes (e.g., according to different properties of archive elements) by using different grouping rules e.g., as defined in patch generator policies 134.

For example, a grouping by file-type may create a sequence of archive elements that in step 322 shall comprise one archive for all PNG files, another archive for all PDFs, and a further archive for the remaining archive elements.

In another example, a grouping of elements by size-rules may create in step 322 archives that are limited by size, e.g., step 322 will close an archive once it reaches a certain size, for example 256 megabytes, has been exceeded by an archive.

In yet another non-limiting example, a grouping by name-rules may create archives that group all filenames according to their first character, e.g., "a", "b", "1" . . . , and so on.

The grouping applies both to internal archive elements of the original archive element 130 and to internal archive elements of the destination archive element 132, or if available, to archive elements in the original archive structure 152 and in the destination archive structure 154.

In step 322, the patching system 110 constructs two grouped archives per group by using at least one archiving module 142, the first of two archives is constructed.

Step 322 identifies whether the selected differencing module 160 is capable of inputs comprising more than one archive element, and in case it is not capable to input more than one archive element, it adds one grouping rule (thus another step 322 iteration) in which all archive elements in the original archive structure 152 will be grouped into one grouped-archive, and all archive elements in the destination archive structure 154 will be archived into another grouped-archive.

A first archive is then created for archive elements from the original archive structure 152 that correspond with the group constructed in step 320. A second archive is created for archive elements from the original archive structure 152 that correspond with the group constructed in step 320.

Each archive is typically stored in a designated location in staging area 150, and may be deleted if not further required, e.g., after performing step 330. Alternatively, each archive may be stored in RAM, in virtual memory, in a file system on storage media or in-memory file system, or in any another location accessible by step 330.

In step 330, patching system 110 constructs a patch package $P_S$ 170, corresponding to the selected ordering, after being properly grouped by steps 320 and 322.

To construct a patch package 170, the patching system 110 checks whether grouped archives were prepared in step 322, and if they were, it selects all grouped archives.

Next, step 330 inputs the grouped archive(s) of original archive structure 152 as source input to differencing module 160, and the grouped archive(s) of the destination archive structure 154 as destination input to differencing module 160, and executes differencing module 160.

Differencing module 160 should generate one patch data 172 in respect of every set of source input and destination input. In case only one set of source input and destination input exist, it creates a single patch data 172, otherwise it creates multiple patch data 172. In the latter, patching system 110 generates one patch instruction 174 in respect of each patch data 172 and add it to patch package 170.

Patching system 110 now constructs one patch package $P_S$ 170 where "s" is a unique identifier of this particular patch package.

In some "single-archive input" embodiments, defined below, the input(s) to step 330 may comprise only of one archive input, e.g., destination input only. In such cases, step 330 may either treat the original input as 'null', 'nil' or 'empty' depending on the implementation, or treat the original input as not existing. If step 330 treats the original input as not existing, it may execute a compression module 141 instead of differencing module 160 over the inputs, and store the output of said compression module 141 in patch data 172, optionally indicating so in the corresponding patch instruction 174.

In step 340, patching system 110 checks whether further orderings are required, e.g., according to generator policies 134, and if so, increments "s" as applicable according to its type (integer, hash key, and so on) and repeats steps 310 to 340.

In step 350, patching system identifies the most efficient patch package of patch packages $P_{1 \ldots S}$ and identifies it using its unique identifier "D". Said most efficient patch package, ("MEP" or $P_D$) is now maintained while optionally discarding of the other patch packages $P_{1 \ldots S}$) except for $P_D$.

Any staging area 150 storage space claimed and/or used by previous steps is typically released at this point, whether in memory, RAM or on storage media, or any other location used by staging area 150.

Reference is now made again to process 200 shown in FIG. 2, in cases where only one archive element is input to the process, e.g., a destination archive element 132. In such special cases of process 200 described above, referred to as 'single-archive input' cases in the context of the present disclosure, there is either no original archive element 130 to differentiate from or the original archive element 130 contains no archive elements or no data. Thus, process 200 may operate by assuming there are no original elements in any matching pair during the execution of processes 200 and/or 300, to infer that all data of destination element is actually missing on the receiving end, typically indicating an "add" action as described above.

A case of 'single-archive input' is different from a case where the destination element is missing in its entirety, or missing internal archive elements—wherein process 200 will indicate 'delete' actions for such missing archive elements.

A patch package 170 prepared by executing processes 200 and/or 300 with no data included in the original archive element 130 may benefit from all above-mentioned benefits or goals.

Such patch package(s) 170 are useful in many use cases. Notable examples include:

(1) preparing a compressed archive that is often better compressed than regular compressed archive, in case two or more internal archive elements in destination archive element 132 were previously separately compressed, e.g., using a compression module 141, and are to be archived together;

(2) archiving a set of related archive elements that are documents in one of the Open Document (XML-based) compressed formats. This is particularly useful in the context of document management and version control systems such as in U.S. Pat. No. 8,768,962 and others;

(3) preparing a snapshot of a plethora of archive elements, e.g., for backup and later restoration, where two or more archive elements include identical data portions, include identical internal archive elements as described above, or include identical archive elements. This is particularly useful in the context of backup and restore systems and methods.

Different embodiments of single-archive input processes 200 and 300 may be constructed. In a preferred embodiment, all steps of process 200 and all steps of process 300 are implemented, so that maximal efficiency may be sought.

In general, handling single-archive input cases described above may be performed by executing steps of processes 200 and/or 300 with minor adaptations that will be evident to any person skilled in the art reading the present disclosure, as described below.

For example, in some single-archive input embodiments, differencing module 160 may be input with an empty original archive structure 152 e.g., that contains no archive elements, while in some other single-archive input embodiments, differencing module 160 may be input with a null reference or nil pointer indicating no original archive structure 152, according to the specification of differencing module 160.

In further single-archive input embodiments, in step 330, executing differencing module 160 may be replaced altogether with the execution of a compression module 141 instead, and indicating in patch package 170 that said compression module 141 was used instead of indicating the differencing module 160 as described above.

In addition, some optimizations may be made to data structures of patch package 170, of patch data 172 and of patch instruction 174 at the absence of original elements. For example, such optimizations may include, inter alia, the removal of certain fields within said data structures.

Embodiments that may apply or decompress the resulting patch package 170 using said patch data 172 and patch instructions 174 are described below after the description of FIG. 4.

Figure 4:
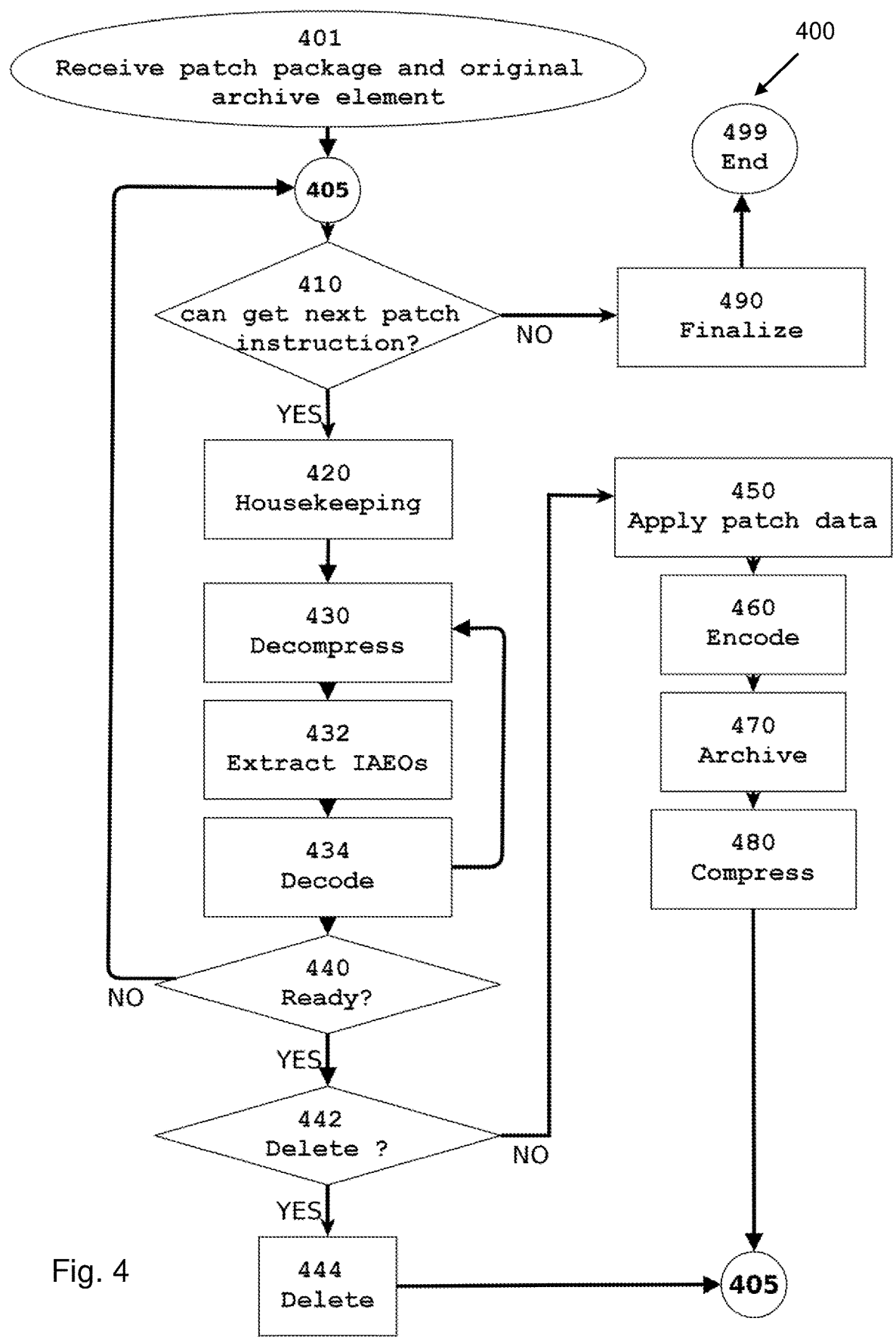
FIG. 4 is a flowchart of a process for reconstructing a destination archive element from an original archive element and a patch instruction, according to an embodiment of the present invention.

Reference is now made to FIG. 4 showing an exemplary process 400 for reconstructing a destination archive element 132 from an original archive element 130 and a patch package 170 that includes patch data 172 and patch instructions 174.

The goals of process 400 are to reverse structural extractions performed by of process 200; to encode archive elements that were decoded by process 200; and to apply a MEP constructed by process 300, as applicable, to archive elements in or at original archive element 130—eventually resulting in a correctly constructed destination archive structure 154.

One key element in the execution of process 400 is to correctly archive, encode or compress archive elements that were previously unpacked, decoded or decompressed during processes 200, 300 on the patching system 110 computer. Since some of such archive elements were originally part of a container archive element having a "directory", "archive" or "compressed" structural type, in order to reconstruct said container archive element, said such archive elements should first be transformed, e.g., by transformational module(s) 140 to their original format. In some embodiments this may be achieved by traversing patch instructions 174 in a reverse order, while in other embodiments this may be achieved by traversing patch instructions 174 in case processes 200, 300 have recorded patch instructions 174 in a sequence that is in accordance with their patch-applying order.

In step 401 the Patch applier 112 receives three inputs: an original archive element 130, $P_O$ which is a patch package 170 comprising patch-instructions 174 for reconstructing a destination archive element 132 using original archive element 130, and the patch data (aka "payload") 172 to be processed by the steps of process 400. In some embodiments, step 401 may first ensure that the two inputs 130, 170 are valid, e.g., are in a correct format, contain valid data, do not contain 'injected' data of malice content, and so on, as known in the art.

Typically, when first executed, the original archive element 130 designates an original archive element 130 existing on the executing computing device (OA); $P_O$ comprises all patch-instructions 174 and patch data 172 in respect of constructing destination archive element 132 from original archive element 130 using $P_O$; and both original archive element 130 and $P_O$ contain internal archive elements to be updated, added or deleted, in accordance with patch instructions 174 in $P_O$.

In some embodiments, said patch instructions 174 may be packaged in the same file or data-structure along with the data of $P_O$, e.g., to more efficiently transmit both data elements; to package all inputs required for process 400 in one data structure; and so on. In some embodiments, said patch instructions 174 are stored within an internal archive element (e.g., a file) within patch package $P_O$.

In some embodiments, process 400 prepares a working copy of original archive element 130, i.e., of OA, in a designated area, i.e. destination archive structure 154, within staging area 150. In some embodiments, process 400 then first performs its process steps on said copy in the staging area 150, and only when done, will then apply the resulting destination archive structure 154 to the original archive structure 152. For example, when process 400 updates subdirectories under "C:\Program Files", it may oftentimes create a copy of the internal archive elements of original archive element 130 as an extracted original archive structure 152 on staging area 150, as well as create an empty copy comprising the result destination archive structure on staging area 150. In some further embodiments, process 400 may only create one copy, e.g., the result destination archive structure 154, on staging area 150, and apply steps of process 400 to said result destination archive structure 154. In yet further embodiments, steps of process 400 are performed in-place, thus no copies of internal archive elements of original archive element 130 are created, and steps of process 400 operate directly on internal archive elements in the storage location of original archive element 130. Oftentimes, said yet further embodiments are preferred when the entire data resides in memory, e.g., in RAM.

In general, process 400 can be segmented into four major clusters of steps occurring in respect of a patch instruction 174: steps 401-420 perform house-keeping activities for patch applier 120 including memory allocation and internal process tests; steps 430-440 assure that the archive element to be updated is ready e.g., on staging area 150 in a data format that patch data 172 can be applied to; step 450 applies patch data 172 to construct patched archive element(s) in destination archive structure 154; and finally steps 460-480 assure that said patched archive element(s) are in their final data-format. Typically, process 400 repeats until no further patch instructions 174 exist; however, process 400 may stop repeating according to rules e.g., set in applier policy 136.

In step 410, the Patch applier 112 iterates through all the patch instructions 174, in every iteration reading the next patch instruction 174 from patch package 170. In the first execution of step 410, this would typically be the first patch instruction.

In a preferred embodiment, the order of patch instructions as created by processes 200 and 300 whose traversal algorithm is in accordance with a Depth-first Search (DFS) algorithm, would imply that all the instructions relevant to one archive element, e.g., to a compressed archive element described by a patch-instruction, would follow one by one, thus simplifying the burden of tracking open archives e.g., to a stack data structure. However, in certain embodiments, e.g., in case of Breadth-first Search (BFS), more sophisticated tracking of open archives may be necessary, and thus the optional house-keeping step 420 will assure such situations are properly handled.

Typically, at this point Patch applier 112 shall test for a matching archive element in the OA. A matching archive element is one that the patch instruction applies to, i.e., patches, by comparing the identifier of said archive element identifier with the identifier stored in said patch instruction. In some cases, a matching archive element is not found in the OA thus requiring creating an empty matching archive element in the OA. In other some cases, a matching archive element for an archive element in the OA in not found in the patch instructions, e.g., indicating no change has been made to said archive element in the OA.

If there is no next patch instruction in 174, it is understood that the process has executed all the patch instructions 174 and the process thus ends by executing step 499.

In optional step 420 the Patch applier 112 checks whether any house-keeping activities are pending. Pending house-keeping activities include tending to any archive elements that are left from previous iterations of process 400.

Patch applier 112 may close and/or delete archive elements used by process 400 to comprise archives ("archived archive elements") and/or decompressed archive elements, and perform any housekeeping (e.g., memory release, API calls) required to indicate said archives and/or decompressed archive elements have no further use in process 400 and may be released.

In one non-limiting example, archived archive elements that were already archived e.g., to a '.tar' format archive may be deleted in case they are not referenced by any further patch instruction 174 having a 'link' structural-type.

In another non-limiting example, archive elements that were decompressed e.g., from a '.xz' format may be deleted in case they are not referenced by any further patch instruction 174 having a 'link' structural-type.

In yet another non-limiting example, archived archive elements and decompressed archive elements prepared during the execution of process 400, and that are not required to construct any archive elements specified in patch instructions 174 (in patch package 170) may be deleted in case they are not referenced by any further patch instruction 174 having a 'link' structural-type.

In a further non-limiting example, storage space allocated for staging area 150 that is not further required by process 400 to handle further patch instructions 174 may be safely released, e.g., in order to reduce storage requirements of process 400.

If patch instructions 174 are ordered so that all patch instructions relevant to one directory, one archive or one compressed archive element are grouped to follow one another, then in a preferred embodiment step 420 can be performed by inspecting whether the new patch instruction refers to an archive element which is not currently unpacked, and also by determining whether Patch applier 112 has completed a traversal into an archive location.

In embodiments where the ordering of patch-instructions is different, more complex traversal and record-keeping would be required in order to track which archived archive elements and/or decompressed archive elements are still being used, e.g., by using hash-maps, arrays, linked-lists, indications within patch package 170 or memory stacks to indicate which archives are unpacked.

Step 430 is the first in a sequence of steps required to assure that the location indicated in patch instruction 174 is available for applying patch data 172, e.g., the Patch applier 112 checks whether the archive elements indicated in the patch instruction 174, e.g., by their location and identifier, require structural transformation.

In step 430, the Patch applier 112 checks whether the location in patch instruction 174 indicates a compressed archive element in the original archive, and if not, proceeds to step 432. To determine so, Patch applier 112 uses an indication in patch instruction 174 or content identifying module(s) 148 as explained above.

Step 430 then decompresses at least the indicated archive element from the patch instruction 174. In some embodiments, it is necessary to decompress all internal archive elements comprising the compressed archive element indicated in said location, e.g., due to built-in limitations of compression module(s) 141 or decompression module(s) 144.

Step 430 may mark said archive element as decompressed for later use, e.g., to indicate to step 480 that (re-)compression is required after patch data 172 was applied to said archive element.

Step 430 may repeat as many times as necessary in order to extract the archive element indicated by said location, e.g., in cases an archive element to be patched exists within a compressed archive element which is, in turn, an archive element contained within another compressed archive element. Thus, step 430 may repeat e.g., until the location indicated in patch instruction 174 is fully decompressed.

Step 430 typically checks whether said archive element on the destination archive structure 154 is unpacked, and whether said archive element on the original archive (e.g., in the original archive structure 152) is unpacked; and if not, whether they require unpacking before it is further processed.

To determine whether the archive element is unpacked, Patch applier 112 may utilize similar systems and methods as process 200 when determining an archive element's type, or according to an indication in the patch instruction 174, or as indicated by testing the actual archive element in its location via system calls (e.g., an API) and so on as applicable in the art.

In step 432, the Patch applier 112 checks whether the archive element is an archive. To determine so, Patch applier 112 utilizes similar systems and methods as process 200 when determining an archive element's type, e.g., content identifying module(s) 148, or according to an indication in the patch instruction 174.

If the unpacked archive element is an archive, step 432 may be repeated until the archive element to be updated indicated in patch instruction 174 is available for updating, e.g. until the location indicated in patch instruction 174 is fully unpacked.

In step 432, the Patch applier 112 unpacks internal archive elements from the archive element, which is an archive, by using an appropriate unpacking module 145, to a designated location. In the preferred embodiment, this extraction process is performed onto a destination archive structure 154 located in staging area 150 so that each of said internal archive elements is placed in its own designated location on the staging area 150 (e.g., a newly created folder or an allocated memory location in case the operations are performed in an internal memory and not in a file-system).

In other embodiments, unpacking may be done directly in memory, and process steps may then be performed in memory.

In further embodiments, unpacking may be done directly on the original archive 130 by placing unpacked elements in-place. This is particularly useful when the patch instructions 174 are expected to be fully performed, e.g., without an error; or e.g., when sufficient space for in-place.

For example, in case step 432 encounters an archive element which is identified by step 431 as ".cab" (Microsoft™ Cabinet) file, the preferred embodiment may create a new location (e.g., a temporary directory) on staging area 150 and unpack said archive element into its contained internal archive elements $IAEO_{1...n}$ where "n" is a unique identifier for each IAEO, e.g. a sequential number.

In step 432, the Patch applier 112 may mark said designated location of step 431 for later re-packing. This is important in typical cases where a patch-instruction 174 indicates an action to be performed in respect of an internal archive element $IAEO_n$ extracted by step 432.

To continue the non-limiting example of step 432, the preferred embodiment marks said designated location e.g., by placing it in a stack, a linked-list or an array.

In step 440, the Patch applier 112 checks whether there is an indication in the patch instruction 174 to decode destination archive element 132 prior to applying its patch data 172. If such an indication does not exist it proceeds to execute step 442.

An indication in step 440 may be explicit data in the patch instruction 174 containing an indication to decode the archive element in the patch instruction 174. Said indication may also be implicitly derived by comparing the type of the archive element, with the corresponding archive element in the original archive. An indication may also be derived from a file-extension describing an archive element, if file-extensions are trusted by Patch applier 112. Another type of indication may be implicitly derived by utilizing content identifying module(s) 148 (e.g., using the triple-test in Unix utility 'file').

Next, the Patch applier 112 selects a decoding module 146 capable of decoding the archive element. To select an appropriate decoding module 146 it may use said indication.

After selecting decoding module 146, step 434 operates decoding module 146 to decode the contents of the archive element into decoded data. During the process of decoding, decoding module 146 reads and utilizes specific metadata contained within the archive element, which describes the contained encoded data. For example, it can read metadata specifying that a PNG image has specific x-axis and y-axis dimensions expressed in pixels, and a specific color depth, as well as whether transparency (alpha channel) exists, and what compression level was used to compress it. Patch applier 112 typically reuses this metadata later e.g., in step 481 when reconstructing the archive element, and therefore step 434 may keep said metadata for such later use, optionally releasing its storage space during house-keeping step 420.

The decoded data is then either stored in-place, e.g., by replacing the original archive element in the destination archive structure 154; or by placing it in staging area 150; or by storing it in-memory.

Step 434 may repeat until the location indicated in patch instruction 174 is fully decoded.

Since nested locations may be of multiple nested level, each such nested level being either a compressed, archived or encoded structural type, steps 430, 432 and 434 may repeat until the location indicated in patch instruction 174 is fully unpacked, decompressed and/or decoded in accordance with the specific location.

Step 440 checks whether the archive element indicated in patch instruction 174 is ready to be updated, e.g., that its location has been unpacked, decompressed and decoded to comply with patch instruction 174. In case the check fails, steps 430 to 434 are repeated until the destination archive element 132 is available for updating and is decoded to the format so indicated. Then, execution continues to step 442.

At this stage, the preferred embodiment has the archive element being patched ready, as defined above, so process 400 may proceed to applying its patch data 172, encoding it, archiving it, compressing it or deleting it in accordance with patch instruction 174.

In step 442, the Patch applier 112 checks whether the action indication in the patch instruction 174 designates a "delete" operation, and in case it does, proceeds to step 444 where the Patch applier 112 deletes the archive element in its location in staging area 150 or in the destination archive structure 154, according to the location chosen earlier. In case step 444 was executed, the process next proceeds to step 410 to get the next patch instruction, otherwise it proceeds to step 450.

In step 450, the Patch applier 112 selects a patch applying module 180 available to Patch applier 112 according to an indication in the patch-instruction 174. This indication may be an explicit indication, e.g., "bsdiff", or an implicit indication, for example in case only one patch applying module 180 is associated with patch applying system 112, or for example in case the data in $P_0$ may be correctly input only to one patch applying module 180.

Once selected, patch applying module 180 is executed on the original element using the patch data (payload) 172. The resulting data from said execution of patching module 180 is then stored in a destination element.

According to the implemented embodiment and/or as indicated in applier policies 136, said destination element is then stored either in the location indicated in patch instruction 174 in the destination archive structure 154, in staging area 150, or directly in (applied to) original archive element 130.

In step 460, the Patch applier 112 checks whether an encoding of the resulting destination element from step 450 should be performed.

There are several cases in which the preferred embodiment encodes destination archive element 132:
a) in case the patch-instruction 174 explicitly requires so, e.g., by an indication of a requested data-format for the resulting destination archive element 132 such as a PNG image;
b) by default, any time that step 434 has decoded original archive element 130 and applied patch payload $P_0$ to it;
c) in case the patch-instruction 174 implicitly requires so, e.g., by an indication of destination file-format that is different from the file-format of the original archive element being updated.

In some embodiments, encoding of a destination element may also take place even if there was no decoding performed in step 461. In further embodiments, encoding of a destination element may also take place even if there is no data in the patch payload 172, e.g., to result in an archive element comprising only the technical description of a selected encoding without any contained data.

Such cases may be particularly useful in order for Patch applier 112 to simply convert the resulting type of a destination element, without actually storing or sending (e.g., over networks) any contents of said destination element. This is exemplified e.g., in case of a software publisher replacing only a file-format from e.g., JPG to PNG, without disseminating any data in the patch payload 172. By example, in such a case, encoding the entire data structure of all files in a directory of an original archive (OA) comprising of 100 images in the JPG format to the PNG format, can be easily performed by simply sending 100 patch instructions 174 indicating so.

Depending on data structure employed by the embodiment, this can be more succinctly expressed by indicating the original data format to decode and the resulting data format to encode with, directly on a patch-instruction relating to a directory or an archive. For example: {name="archive.tar"; action="update"; Dtype="JPG"; Etype="PNG"}.

Patch applier 112 encodes the destination element to the indicated encoding type, by first selecting an appropriate encoding module 143 and then encoding the contents of the destination element using this encoding module 143.

This is where metadata captured in the patch-instruction 174 is used. Encoding module 143 executed by step 481 would typically require some parameters to encode, or re-encode, the destination element to its original form, especially if first decoded, e.g., in step 460.

If first decoded e.g., in step 460, Patch applier 112 uses the metadata identified by step 434 to re-encode destination archive element 132. In other cases, the patch-instruction 174 may contain metadata instructing how to recreate it, and then Patch applier 112 uses this metadata to encode the archive element, e.g., back to an original form.

The resulting encoded archive element of step 460 should be either added or replace any previously existing archive element with identical identifier (e.g., location) in the destination archive structure 154.

In step 470, Patch applier 112 checks whether the destination archive element from previous steps should be archived. To determine so, step 470 may use an indication in patch instruction 174, a mark set by step 432.

In a preferred embodiment, the actual archiving of a destination archive element 132 may be deferred until all destination archive element(s) 132 comprising have completed updating, e.g., by steps 430-450.

To archive the destination element(s), step 470 first determines an archiving module 142. To determine so, step 470 may use an indication in patch instruction 174, an indication or a rule in applier policies 136, or a mark made by step 432. Depending on the determined archiving module 142, the destination archive element 132, or all relevant destination element(s) in case archiving was deferred in accordance with the specification above, as well as the archive element indicated in patch instruction 174 are input to archiving module 142, and archiving module 142 is then executed.

The resulting archive of step 470 should be either added or replace any previously existing archive with identical identifier (e.g., location) in the destination archive structure 154. In a subsequent iteration, house-keeping step 420 may assure that all said destination element(s) are released e.g. from memory or file-system in accordance with the specification of step 420.

In step 480, Patch applier 112 determines whether the destination archive element from previous steps should be compressed. To determine so, step 480 may use an indication in patch instruction 174, or a mark set by step 430.

To compress the destination element(s), step 480 next selects a compression module 141. To select so, step 480 may use an indication in patch instruction 174 (e.g., "xz"), an indication or a rule in applier policies 136, or a mark made by step 430.

In a preferred embodiment, the actual compression of the destination element(s) may be deferred until all destination element(s) comprising the same compressed archive element have completed updating, e.g., by steps 430-450. In some cases, however, the selected compression module 141 cannot process more than one element. In these cases, selected compression module 141 should be executed for each of the destination element(s) in separate.

To compress said destination element(s), step 480 next inputs said destination element(s) to compression module 141, along with any relevant metadata that may be stored in patch instruction 174. Step 480 then executes compression module 141, typically resulting in a compressed archive element.

The resulting compressed archive element should be either added or replace any previously existing compressed archive element having an identical identifier (e.g., location) in the destination archive structure 154. In a subsequent iteration, house-keeping step 420 may assure that all said destination archive element(s) 132 comprising the same compressed archive element are released, e.g., from memory or filesystem in accordance with the specification of step 420.

In final step 490, Patch applier 112 has determined that no further patch instruction 174 exist, and process 400 may conclude.

In a preferred embodiment, step 490 should assure that the destination archive structure 154 contains no data, metadata or contents (e.g., directories, files, memory objects, and so on) that should not be part of the final destination archive element 134. Step 490 may achieve this e.g., by comparing all patch instructions 174 with the resulting destination archive structure 154, by calling step 420 (e.g., without continuing to step 430) for house-keeping any remaining data and storage-space previously used by process 400. In some embodiments, a final run of steps 430-480 for the last patch instruction 174 may be required, especially in case the original archive element 130 and destination archive element 132 are in compressed format, archive format, or both (e.g., a "tar.gz" compressed archive).

Finally, step 490 assures that the resulting destination archive structure 154 correctly represents the destination archive as technically described in patch package 170. Typically, when process 400 is using a copy of the destination archive e.g., on staging area 150 that is different from the destination archive element 132 itself, step 490 would copy all changed archive elements in the destination archive structure 154 onto destination archive 132, while deleting any archive element in destination archive 132 that does not exist in destination archive structure 154.

In some embodiments, process 400 may receive a patch package 170 generated by processes 200 and/or 300 in accordance with a single-archive input case. In general, handling single-archive input cases described above may be performed by executing steps of process 400 with minor adaptations, as described below.

For example, in some single-archive input embodiments, patch applying module 180 may be input with an empty original archive structure 152 e.g., that contains no archive elements, while in some other single-archive input embodiments, differencing module 160 may be input with a null reference or nil pointer indicating no original archive structure 152, according to the specification of patch applying module 180.

In further single-archive input embodiments, in step 450, executing patch applying module 180 may be replaced altogether with the execution of a decompression module 144 instead, especially if indicated in patch package 170 that a compression module 141 was used instead of a differencing module 160 as described above.

In addition, optimized data structures may exist in patch package 170, in patch data 172 and in patch instruction 174 at the absence of an original archive element 130. For example, such optimizations may include, inter alia, the removal of certain fields within said data structures, e.g., that relate to the non-existing original archive element.

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Xeon®, Pentium® or Centrino™ processor, that are adapted to communicate with the computer. Any number and type of machines may be in communication with the computer.

The invention claimed is:

1. A patch generating computing system comprising:
   at least one processor; and
   at least one memory communicatively coupled to said at least one processor comprising computer-readable instructions that when executed by the at least one processor cause the computing system to implement a method of generating a patch package 170 comprising patch data 172 and patch instructions 174, said patch package adapted to update an original archive element 130 to a destination archive element 132, the method comprising:
   (i) assigning the original archive element 130 as an original element in a matching pair, and assign the destination archive element 132 as a destination element in said matching pair;
   (ii) comparing said original element and said destination element in said matching pair, and if different, preparing a corresponding patch instruction 174 comprising an action indicating a patch operation of either addition, deletion or updating related to said destination element;
   (iii) identifying a structural type of said original element and said destination element, said structural type being one of directory, archive, compressed or data;
   (iv) if said structural type is a complex archive element:
      a. identifying at least one decompressing module 144 or unpacking module 145 adapted to be applied to said original element and said destination element;
      b. applying the identified at least one decompressing module or unpacking module to said original element, and saving resulting zero or more internal archive elements to an original archive structure 152 comprising a plurality of archive elements;
      c. applying the identified at least one decompression module or unpacking module to said destination element, and saving the resulting zero or more internal archive elements to a destination archive structure 154 comprising the plurality of archive elements;

(v) updating a patch instruction 174 in respect of said destination element, the patch instruction comprising said patch instruction action, the structural type, an identifier of said destination element, and the identified at least one decompressing module or unpacking module;

(vi) identifying further one or more matching pairs, each further one or more matching pair comprising of one internal archive element from said resulting zero or more internal archive elements of step (iv.b) assigned as internal element, and the one internal archive element from said resulting zero or more internal archive elements of step (iv.c) assigned as destination element, wherein said original element and said destination element are matched by identifying an identical identifier;

(vii) repeating steps (ii) to (vi) for said further one or more matching pairs; and (viii) applying a differencing module 160 to the original archive structure and the destination archive structure and generating the patch package 170 comprising the patch data 172 and the patch instructions 174 such that the destination archive element 132 can be constructed by applying said patch data 172 together with said patch instructions 174 to the corresponding original archive element 130.

2. The patch generating computing system of claim 1, wherein when the identified structural type of an archive element is data, said method further comprising:

a. identifying a datatype of said destination element and identifying a decoding module 146 capable of transforming the identified datatype into a decoded data format;

b. applying the identified decoding module 146 to said destination element and generating a decoded version of said destination element to replace said destination element in the destination archive structure 154;

c. applying the identified decoding module 146 to said original element and generating a decoded version of said original element to replace said original element in the original archive structure 152; and d. indicating said datatype or said decoding module 146 or both in said patch-instruction 174.

3. The patch generating computing system according to claim 1, wherein prior to step (viii) said archive elements are ordered one or more times according to ordering criteria into a grouped sequence of said archive elements, and in step (vi) said archive elements are input to said differencing module 160 one or more times in said grouped sequence, resulting in the one or more patch packages 170.

4. The patch generating computing system according to claim 3, wherein the ordering criteria comprise: a natural order, a sorted order, the matching pairs of said archive elements are grouped according to their identified datatypes, the matching pairs are grouped according to a property of their archive elements, the matching pairs according to a property of said archive elements within the patch instruction 174, or any combination thereof.

5. The patch generating computing system according to claim 1, wherein in step (viii) multiple differencing modules 160 are applied, resulting in multiple patch packages 170.

6. The patch generating computing system according to claim 1, wherein in step (viii) the differencing module 160 is run multiple times using different differencing module parameters comprising dictionary size and/or compression level, resulting in multiple patch packages 170 in respect of every differencing module 160 run.

7. The patch generating computing system according to any of claims 3 to 6, further comprising step of identifying a most efficient patch from the resulted patch packages 170, according to predetermined selection criteria.

8. The patch generating computing system according to claim 1, wherein said original archive element 130 is null, resulting in the patch package 170 that is a compressed form of the destination archive element 132.

9. The patch generating computing system according to claim 1, further comprising patch generator policies 134 that specify rules and preferences for how to generate the patch package 170.

10. The patch generating computing system according to claim 1, wherein in step (iii) the structural type of link can be identified.

11. The patch generating computing system according to claim 10, further including in the patch-instruction 174 an indication of another archive element containing same data as said destination element, or an indication of another patch instruction 174 resulting in said destination element.

12. A patch generating method, implemented in a computing system comprising:

at least one processor; and at least one memory communicatively coupled to said at least one processor comprising computer-readable instructions that when executed by the at least one processor cause the computing system to implement a method of generating a patch package 170 comprising patch data 172 and patch instructions 174, said patch package adapted to update an original archive element 130 to a destination archive element 132, the method comprising:

(i) assigning the original archive element 130 as an original element in a matching pair, and the assign destination archive element 132 as a destination element in said matching pair;

(ii) comparing said original element and said destination element in said matching pair, and if different, preparing a corresponding patch instruction 174 comprising an action indicating a patch operation of either addition, deletion or updating related to said destination element;

(iii) identifying a structural type of said original element and said destination element, said structural type being one of directory, archive, compressed or data;

(iv) if said structural type is a complex archive element:

a. identifying at least one decompressing module 144 or unpacking module 145 adapted to be applied to said original element and said destination element;

b. applying the identified at least one decompressing module or unpacking module to said original element, and saving resulting zero or more internal archive elements to an original archive structure 152 comprising a plurality of archive elements;

c. applying the identified at least one decompression module or unpacking module to said destination element, and saving the resulting zero or more internal archive elements to a destination archive structure 154 comprising the plurality of archive elements;

(v) updating a patch instruction 174 in respect of said destination element, the patch instruction comprising said patch instruction action, the structural type, an identifier of said destination element, and the identified at least one decompressing module or unpacking module;

(vi) identifying further one or more matching pairs, each further one or more matching pair comprising of one internal archive element from said resulting zero or more internal archive elements of step (iv.b) assigned as internal element, and the one internal archive element from said resulting zero or more internal archive elements of step (iv.c) assigned as destination element, wherein said original element and said destination element are matched by identifying an identical identifier;

(vii) repeating steps (ii) to (vi) for said further one or more matching pairs; and (viii) applying a differencing module 160 to the original archive structure and the destination archive structure and generating the patch package 170 comprising the patch data 172 and the patch instructions 174 such that the destination archive element 132 can be constructed by applying said patch data 172 together with said patch instructions 174 to the corresponding original archive element 130.

13. A patch application computing system comprising:
at least one processor; and
at least one memory communicatively coupled to said at least one processor comprising computer-readable instructions that when executed by the at least one processor cause the computing system to implement a method of generating a destination archive element 132 based on an original archive element 130 and a patch package 170 comprising a plurality of patch instructions 174 and patch data 172, the method comprising:
for each patch instruction of said patch instructions 174, perform on the element indicated by said patch instruction:
  (i) identifying the structural type of said element, said structural type comprising directory, archive, compressed, link or data, and an action in respect of said element;
  (ii) identifying said element within said original archive element as original element, and if necessary, applying steps (iii) and (iv) to its location in order to obtain said element in cases it is within an archive or within a compressed location;
  (iii) if said structural type is compressed:
    a. identifying a decompression module 144 capable of decompressing said original element;
    b. decompressing said original element to destination elements and storing said destination elements in a destination archive structure 154;
    c. marking said original element for compressing;
  (iv) if said structural type is archive:
    a. identifying an unpacking module 145 capable of unpacking said original element;
    b. unpacking said original element to destination elements and storing said destination elements in the destination archive structure 154;
    c. marking said original element for archiving;
    d. if said action indicates link, obtain another element in the destination archive structure 154 indicated in said patch instruction 174, and replacing data of said element with the data of said another element in the destination archive structure 154;
  (v) if said original element was marked for archiving or for compressing, identifying all patch instructions 174 having a location in the location of said original element, and executing steps (i) to (v) for each of said patch instructions having such location;
  (vi) if said action indicates add or update execute patch application module 180 on said destination element using the patch data 172 resulting in an updated version of said destination element;
  (vii) if said action indicates delete, delete said element; otherwise:
    a. if said structural type is archive or said element was marked for archiving, identifying an archiving module 142 capable of archiving said element, archiving said element according to an indication and/or metadata in the patch instruction 174; and
    b. if said structural type is compressed or said element was marked for compression, identifying a compression module 141 capable of compressing said element, compressing said element according to an indication and/or metadata in the patch instruction 174.

14. The patch application computing system of claim 13, wherein before step (v.), if said patch instruction 174 indicates decoding, then:
  (i) applying a matching decoding module 146 to said element resulting in a decoded element, replacing said destination element with said decoded element, and marking said destination element for encoding;
  (ii) after performing step (vii.b) if said patch instruction 174 indicates encoding or said element was marked for encoding, applying a matching encoding module 143 to said updated version, replacing said destination element with said updated version, and marking said destination element for encoding.

15. The patch application computing system of claim 13, wherein generating the destination archive element 132 is also based on patch applier policies 136.

16. The patch application computing system of claim 13, wherein said patch applier policies 136 comprise rules relate to: logical predicates regarding transformational modules 140, structural types, data types, properties of archive elements, logical predicates regarding patch applying module 180, or any combination thereof.

17. A compression computing system comprising:
at least one processor; and
at least one memory communicatively coupled to said at least one processor comprising computer-readable instructions that when executed by the at least one processor cause the computing system to implement a method of compressing a plurality of destination archive elements 132 into a patch package 170 comprising patch data 172 and patch instructions 174, the method comprising:
  (i) assigning the destination archive element 132 as a destination element in a matching pair, and a null indication as an original element in said matching pair;
  (ii) for every destination archive element 132 in said plurality of destination archive elements, perform:
    a. identifying a structural type of said destination archive element 130, said structural type comprising directory, archive, compressed or data,
    b. if the structural type is compressed, then
      A. identifying at least one decompression module 144 compatible with said destination element;
      B. applying said at least one decompression module 144 to said destination element;

C. storing results of B comprising of archive elements, each archive element being an internal archive element in a destination archive structure 154;

c. if structural type is archive, then
   A. identifying at least one unpacking module 145 compatible with said destination element;
   B. applying said at least one unpacking module 145 to the destination archive structure 154 comprising of the archive elements, each archive element being then internal archive element;
   C. storing the results of B comprising of the archive elements, each archive element being the internal archive element in the destination archive structure 154;

d. updating the patch data 170 and the patch instruction 174 in respect of said destination element, adding said structural type, identifier of said destination element, said identified at least one decompressing module if applicable and said identified at least one unpacking module 145 as applicable;

(iii) repeating step (ii) for a plurality of said archive elements, each archive element being the internal archive element in said destination archive structure 154; and (iv) applying a selected compression module 141 or differencing module 160 to said destination archive structure 154, and generating the patch package 170 comprising the patch data 172 and the patch instructions 174 adapted to reconstructing said plurality of destination archive elements 132.

18. The compression computing system of claim 17, further comprising the step of packaging said destination archive structure 154 into an archive using an archiving module 142 before applying the selected compression module 141 or differencing module 160 in step (iv).

19. A compression computing system comprising:
at least one processor; and
at least one memory communicatively coupled to said at least one processor comprising computer-readable instructions that when executed by the at least one processor cause the computing system to implement a method of compressing a plurality of destination archive elements 132 into a patch package 170 comprising patch data 172 and patch instructions 174, the method comprising:

(i) assigning the destination archive element 132 as a destination element in a matching pair, and a null indication as an original element in said matching pair;

(ii) for every matching pair comprising of a null indication as the original element, and one archive element of said plurality of destination elements as the destination element:
   a. identifying datatype of said destination element and attempt matching a decoding module 146 capable of transforming said destination element into a decoded data format;
   b. if successful matching the decoding module 146, decoding said destination element into the decoded data format, and updating the patch data 170 and the patch instructions 174 accordingly;
   c. storing in a destination archive structure 154 said decoded data format as an archive element if available, and if not, storing said destination element;

(iii) packaging said destination archive structure 154 into an archive using an archiving module 142 if applicable; and (iv) applying a selected compression module 141 or differencing module 160 to said destination archive structure 154, and generating the patch package 170 comprising the patch data 172 and the patch instructions 174 adapted to reconstructing said plurality of destination archive elements 132.

20. The compression computing system of claim 19, further comprising step of packaging said destination archive structure 154 into the archive using the archiving module 142 before applying the selected compression module 141 or the differencing module 160.

* * * * *